(12) United States Patent
Mestré et al.

(10) Patent No.: US 9,240,005 B2
(45) Date of Patent: Jan. 19, 2016

(54) METHODS FOR RISK MANAGEMENT IN PAYMENT-ENABLED MOBILE DEVICE

(75) Inventors: Patrick Mestré, Namur (BE); Cristian Radu, Beauvechain (BE); Paul Vanneste, Ottignies (BE); Simon Phillips, York (GB); Ronald D. Carter, Cambs (GB)

(73) Assignee: MasterCard International, Incorporated, Purchase, NY (US)

( * ) Notice: Subject to any disclaimer, the term of this patent is extended or adjusted under 35 U.S.C. 154(b) by 1011 days.

(21) Appl. No.: 12/915,550

(22) Filed: Oct. 29, 2010

(65) Prior Publication Data
US 2011/0112918 A1 May 12, 2011

Related U.S. Application Data

(60) Provisional application No. 61/258,759, filed on Nov. 6, 2009.

(51) Int. Cl.
*G06Q 20/10* (2012.01)
*G06Q 20/16* (2012.01)
*G06Q 20/20* (2012.01)
*G06Q 20/32* (2012.01)
*G06Q 20/40* (2012.01)
*G07F 7/10* (2006.01)
*G06Q 20/22* (2012.01)
*G06Q 20/04* (2012.01)

(52) U.S. Cl.
CPC .............. *G06Q 20/16* (2013.01); *G06Q 20/20* (2013.01); *G06Q 20/204* (2013.01); *G06Q 20/32* (2013.01); *G06Q 20/3278* (2013.01); *G06Q 20/40* (2013.01); *G06Q 20/4016* (2013.01); *G07F 7/1025* (2013.01)

(58) Field of Classification Search
CPC ... G06Q 20/10; G06Q 20/105; G06Q 20/127; G06Q 20/20; G06Q 20/32; G06Q 20/341; G06Q 20/3821; G06Q 20/40; G06Q 20/403; G06Q 20/4093; G06Q 30/0601
See application file for complete search history.

(56) References Cited

U.S. PATENT DOCUMENTS

| | | | |
|---|---|---|---|
| 4,851,644 A | 7/1989 | Oslin | |
| 5,850,218 A | 12/1998 | LaJoie et al. | |
| 5,991,749 A * | 11/1999 | Morrill, Jr. | 705/44 |
| 7,103,575 B1 * | 9/2006 | Linehan | G06Q 20/12 235/379 |
| 7,707,113 B1 * | 4/2010 | DiMartino | G06Q 20/105 705/41 |
| 7,797,248 B1 * | 9/2010 | Bierbaum | G06Q 20/0652 705/1.1 |
| 7,967,196 B1 * | 6/2011 | Bierbaum | G06Q 20/127 235/375 |
| 8,127,982 B1 * | 3/2012 | Casey | G06Q 20/35785 235/379 |
| 2004/0030601 A1 | 2/2004 | Pond et al. | |
| 2004/0127256 A1 * | 7/2004 | Goldthwaite | G06K 7/0004 455/558 |
| 2004/0210519 A1 * | 10/2004 | Oppenlander | G06Q 20/10 705/39 |

(Continued)

OTHER PUBLICATIONS

Patent Cooperation Treaty, "PCT International Search Report", dated Mar. 2, 2011 for PCT/US2010/054945, 4pgs.

*Primary Examiner* — F. Zeender
*Assistant Examiner* — Dana Amsdell
(74) *Attorney, Agent, or Firm* — Buckley, Maschoff & Talwalkar LLC

(57) ABSTRACT

A payment-enabled mobile device such as a "smart phone" incorporates risk management features that are applicable to its use in contactless payment transactions. Some features may govern when verification of the cardholder's identity is required for consummation of the current transaction. The features may be configurable by the payment card account issuer and/or the user of the mobile device.

5 Claims, 25 Drawing Sheets

(56) References Cited

U.S. PATENT DOCUMENTS

| | | |
|---|---|---|
| 2004/0230535 A1 | 11/2004 | Binder et al. |
| 2005/0119978 A1 | 6/2005 | Ates |
| 2005/0156026 A1* | 7/2005 | Ghosh ................ G06Q 20/045 235/380 |
| 2005/0165864 A1 | 7/2005 | Martino |
| 2006/0122902 A1 | 6/2006 | Petrov et al. |
| 2007/0010330 A1 | 1/2007 | Cooper et al. |
| 2007/0143227 A1* | 6/2007 | Kranzley ............... G06Q 20/02 705/67 |
| 2007/0278291 A1* | 12/2007 | Rans .................... G06Q 20/341 235/380 |
| 2008/0006685 A1* | 1/2008 | Rackley, III ........... G06Q 20/10 235/379 |
| 2008/0010192 A1 | 1/2008 | Rackley, III et al. |
| 2008/0082452 A1* | 4/2008 | Wankmueller ......... G06Q 20/04 705/67 |
| 2008/0128513 A1* | 6/2008 | Hammad et al. ............. 235/492 |
| 2008/0165006 A1 | 7/2008 | Phillips |
| 2008/0167017 A1* | 7/2008 | Wentker ................ G06Q 20/10 455/414.1 |
| 2008/0190784 A1* | 8/2008 | Phillips ................ A45C 11/182 206/39 |
| 2008/0195549 A1* | 8/2008 | Phillips ................ G06Q 20/20 705/64 |
| 2008/0203151 A1* | 8/2008 | Dixon .................... G06K 17/00 235/380 |
| 2008/0235144 A1* | 9/2008 | Phillips ................ G06Q 20/327 705/67 |
| 2009/0043647 A1* | 2/2009 | Hwang ................ G06Q 20/045 705/13 |
| 2009/0098825 A1* | 4/2009 | Huomo .................. G06Q 20/20 455/41.1 |
| 2009/0191811 A1* | 7/2009 | Griffin ................... G06Q 20/10 455/41.1 |
| 2009/0192912 A1 | 7/2009 | Griffin et al. |
| 2009/0192937 A1 | 7/2009 | Griffin et al. |
| 2009/0204545 A1* | 8/2009 | Barsukov ............... G06Q 20/10 705/75 |
| 2009/0307132 A1* | 12/2009 | Phillips ................ G06Q 20/105 705/41 |
| 2010/0051685 A1* | 3/2010 | Royyuru ................ G06Q 20/20 235/379 |
| 2010/0211504 A1* | 8/2010 | Aabye et al. .................... 705/44 |
| 2010/0248779 A1* | 9/2010 | Phillips ................ G06Q 20/32 455/556.1 |
| 2010/0274722 A1* | 10/2010 | Roberts ................. G06Q 20/10 705/44 |

* cited by examiner

|  | A | a | b | c | d | x | y | 1 | 2 | 3 | 4 |
|---|---|---|---|---|---|---|---|---|---|---|---|
| EX. 1 | N | N | Y | N | Y | N | Y | NEVER | UPPER LIMIT | NEVER | LOWER LIMIT |
| EX. 2 | Y | – | Y | – | – | – | Y | ALWAYS | UPPER LIMIT | – | – |
| EX. 3 | Y | Y | Y | – | – | – | Y | UPPER LIMIT | UPPER LIMIT | – | – |
| EX. 4 | N | N | – | N | N | Y | – | UPPER LIMIT NO CVM | ALWAYS | UPPER LIMIT NO CVM | ALWAYS |

FIG. 20C

METHODS FOR RISK MANAGEMENT IN PAYMENT-ENABLED MOBILE DEVICE

CROSS-REFERENCE TO RELATED APPLICATION

This application claims the benefit of U.S. provisional patent application Ser. No. 61/258,759, filed Nov. 6, 2009, which provisional patent application is incorporated herein by reference.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal. The authorization request is routed from the merchant's acquiring financial institution ("acquirer") to a server computer operated by or on behalf of the issuer of the payment account. The issuer's server computer provides a response to the authorization request. If the response indicates that the issuer has authorized the transaction, the transaction is consummated at the point of sale. Later the transaction is cleared for settlement via the acquirer and the issuer.

More recently, cards that incorporate an integrated circuit (IC) have been utilized as payment cards. In various embodiments, IC payment cards may be interfaced to a POS terminal via contacts on the card. During a purchase transaction, the payment card account number and other information may be uploaded from the IC payment card to the POS terminal via the IC card contacts and a contact card reader that is included in the POS terminal. Authorization and clearing may then proceed in substantially the same manner as for a transaction initiated with a mag stripe payment card (putting aside additional security measures that may be implemented by using the processing capabilities of the IC payment card).

In other IC payment card systems, the exchange of information between the card and the POS terminal proceeds via wireless RF (radio frequency) communications. These wireless communication payment cards are sometimes referred to as "contactless" payment cards. One example of a contactless payment card standard is referred to in the United States by the brand name "PayPass" and was established by MasterCard International Incorporated, the assignee hereof. It has also been proposed to use wireless exchanges of information via NFC (Near Field Communication) for payment applications.

Conventional payment system purchase transactions that require real-time on-line communication with the account issuer—for the purpose of authorization or (in a "one message" system) for immediate charge against the customer's account—are sometimes referred to as "on-line" transactions. However, some payment card account issuers are willing to allow certain classes of transactions (e.g., transactions for small monetary amounts) to be consummated for later clearing without obtaining authorization from the issuer's computer while the transaction is pending between the merchant and the customer. In these transactions, the merchant's device (POS system) is not required to engage in communications with the issuer's computer while the transaction is taking place, and the transactions are accordingly sometimes referred to as "offline" transactions. For these transactions, issuers typically consider the risk of a relatively small loss to fraud as being outweighed by the need to speed up the transaction for the convenience of the customer and the merchant.

It has been proposed that the capabilities of a contactless payment card be incorporated into a mobile telephone, thereby turning the mobile telephone into a contactless payment device. Typically a mobile telephone/contactless payment device includes integrated circuitry with the same functionality as the RFID (radio frequency identification) IC of a contactless payment card. In addition, the mobile telephone/contactless payment device includes a loop antenna that is coupled to the payment-related IC for use in sending and/or receiving messages, via short-distance wireless communications, in connection with a transaction that involves contactless payment.

Contactless payment devices in other form factors, such as key fobs, wristwatches, wristbands and stickers, have also been proposed. It has also been proposed that mobile devices other than mobile telephones—such as PDAs with mobile communication capabilities—may also incorporate contactless payment functionality.

In general, issuers of payment card accounts are concerned with the subject of "risk management". Risk management refers to the balancing of the risk of loss due to fraud or over-spending with the costs and inconvenience that may be required for measures that may be undertaken to deter or prevent fraudulent transactions or over-spending. The above-noted practices relating to requiring real-time authorization for some transactions while not requiring such authorization for other transactions are examples of applications of the principles of risk management. The present inventors have now devised additional novel risk management techniques (described below) that are especially suitable for application with payment-enabled mobile devices.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 20C is a table that illustrates specific example configurations of the payment application program in accordance with aspects of the present invention.

DETAILED DESCRIPTION

In general, and for the purpose of introducing concepts of embodiments of the present invention, a payment-enabled mobile device and a POS terminal (and/or other components of a payment system) interact in ways that enhance risk management techniques. In one example, the payment-enabled device may need to be tapped on the POS terminal reader component either once or twice depending on one or more attributes of the transaction. If two taps are required, the payment-enabled mobile device may require the user to acknowledge the transaction details or may require the user to enter a personal identification number (PIN)—before the second tap—again depending on one or more attributes of the transaction.

Figure 1:
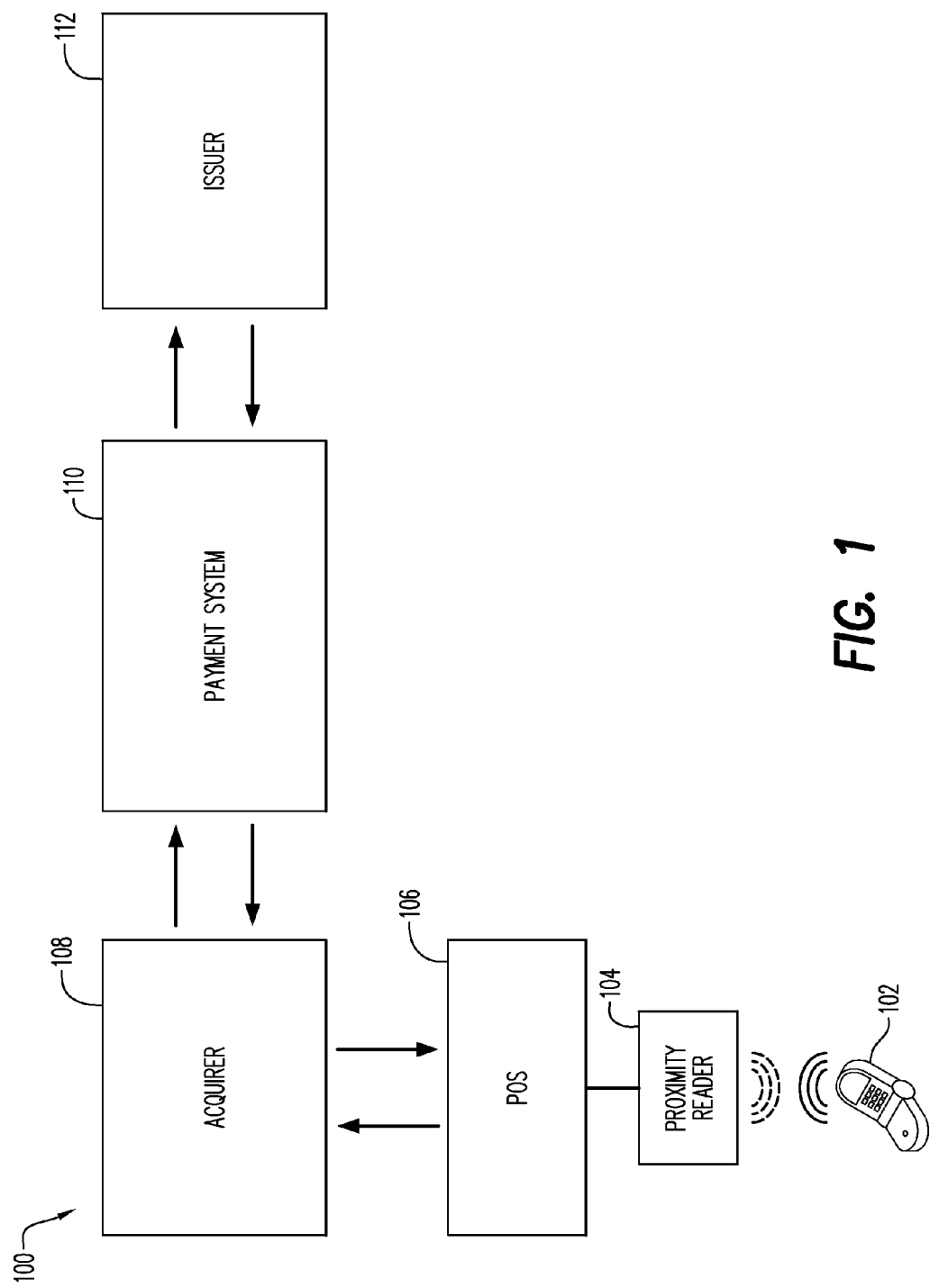
FIG. 1 is a block diagram that illustrates a system provided in accordance with aspects of the present invention.

FIG. 1 is a block diagram that illustrates a system 100 provided in accordance with aspects of the present invention.

The system 100 includes a payment-enabled mobile telephone 102. The payment-enabled mobile telephone 102 may be operable as a mobile telephone, while also being able to perform functions of a contactless payment card and also embodying risk management functionality as provided in accordance with aspects of the present invention and as described below. Further details of the payment-enabled mobile telephone 102 are described below in conjunction with FIG. 4 and other drawings.

The system 100 further includes a proximity reader component 104 associated with a POS terminal 106. The proximity reader component 104 and the POS terminal 106 may be substantially or entirely conventional in their hardware aspects and may also incorporate conventional software capabilities as well as additional software capabilities provided in accordance with the present invention and described below.

As will be recognized by those who are skilled in the art, the proximity reader component 104 and the POS terminal 106 may be located at the premises of a retail store and operated by a sales associate of the retailer for the purpose of processing retail transactions. The payment-enabled mobile telephone 102 is shown in FIG. 1 to be interacting with the proximity reader component 104 and the POS terminal 106 for the purpose of executing such a purchase transaction. Some details of the POS terminal 106 are presented below in conjunction with FIG. 6.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment system 110 to the server computer 112 operated by the issuer of the payment card account that is available for access by the payment-enabled mobile telephone 102. Also in a conventional manner, the authorization response generated by the payment card issuer server computer 112 may be routed back to the POS terminal 106 via the payment system 110 and the acquirer computer 108.

The payment system 110 may be entirely or substantially conventional; one example of a suitable payment system is the well-known Banknet system operated by MasterCard International, Inc., which is the assignee hereof.

Details of the payment card issuer server computer 112 are provided below in conjunction with FIG. 7. However, to briefly anticipate later discussion, the payment card issuer server computer 112 may be operated by or on behalf of a financial institution ("FI"; not separately shown) that issues payment card accounts to individual users. In many respects, the payment card issuer server computer 112 may perform conventional functions, such as (a) receiving and responding to requests for authorization of payment card account transactions to be charged to payment card accounts issued by the FI; and (b) tracking and storing transactions and maintaining account records. In addition, as described in detail below, the payment card issuer server computer 112 may function in accordance with aspects of the present invention.

The components of the system 100 as depicted in FIG. 1 are only those that are needed for processing a single transaction. Those who are skilled in the art will recognize that a practical embodiment of the system 100 may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment-enabled mobile devices and/or payment cards (including contactless payment cards and/or magnetic stripe cards).

It should also be understood that the payment-enabled mobile telephone 102 is operable as a conventional mobile telephone for communication—both voice and data—over a conventional mobile telecommunications network, which is not depicted in the drawing. Thus, the payment-enabled mobile telephone 102 is in communication in a conventional manner with a mobile network operator ("MNO"—also not shown). An over-the air communication channel (not shown in FIG. 1) between the payment-enabled mobile telephone 102 and the payment card issuer server computer 112 (or a related computer) may be established from time to time for purposes such as personalization (as discussed below) of the payment application program in the payment-enabled mobile telephone 102; for updates to the personalization; for loading/reloading pre-paid/pre-authorized funds in connection with the payment application program; and/or for resetting a counter or accumulator that is established in the payment-enabled mobile telephone 102 for risk management purposes.

Figure 2:
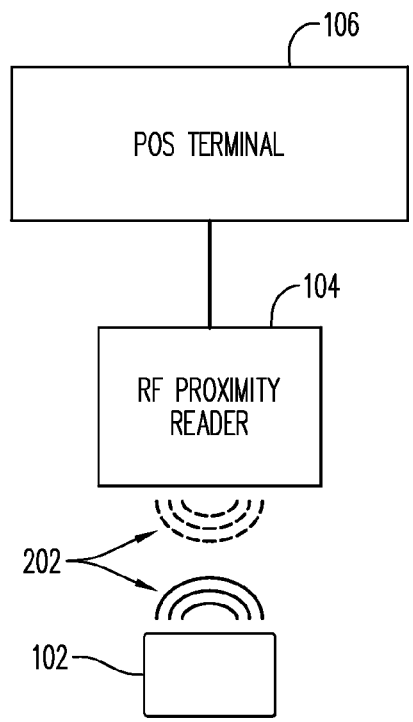
FIG. 2 is a block diagram that illustrates communication aspects of a purchase transaction that utilizes a payment-enabled mobile telephone.

FIG. 2 schematically illustrates some communication aspects of a typical purchase transaction in which the payment-enabled mobile telephone 102 is used. The POS terminal is represented at block 106, and the proximity reader component is represented by block 104. Wireless communication between the payment-enabled mobile telephone 102 and the proximity reader component 104 is indicated at 202. The wireless communication 202 may be conducted in accordance with one or more standard protocols, such as "EMV Contactless" and/or NFC all of which are well known to those who are skilled in the art.

Figure 3:
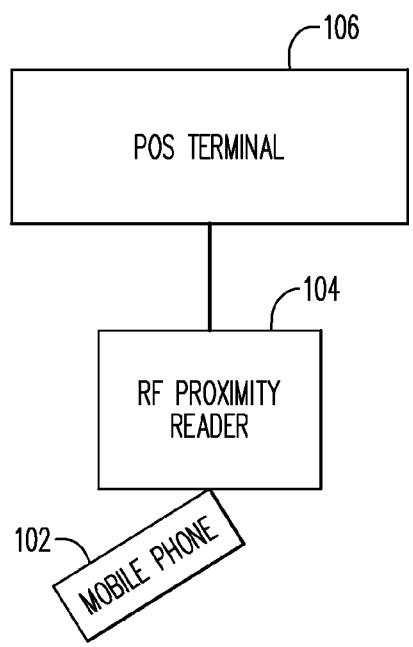
FIG. 3 is a block diagram that illustrates physical aspects of the transaction shown in FIG. 2.

FIG. 3 schematically illustrates some physical aspects of the purchase transaction. As in FIG. 3, the POS terminal 106 and its associated proximity reader component 104 are shown. The payment-enabled mobile telephone 102 is also shown in proximity to the proximity reader component 104. In a common manner of initiating the wireless communication depicted in FIG. 2, the user of the payment-enabled mobile telephone 102 briefly taps the payment-enabled mobile telephone 102 at a particular location on the proximity reader component 104. The location on the proximity reader component 104 at which the payment-enabled mobile telephone 102 is to be tapped may be indicated to the user by a standard logo affixed to the proximity reader component 104, such as the "PayPass" logo.

Figure 4:
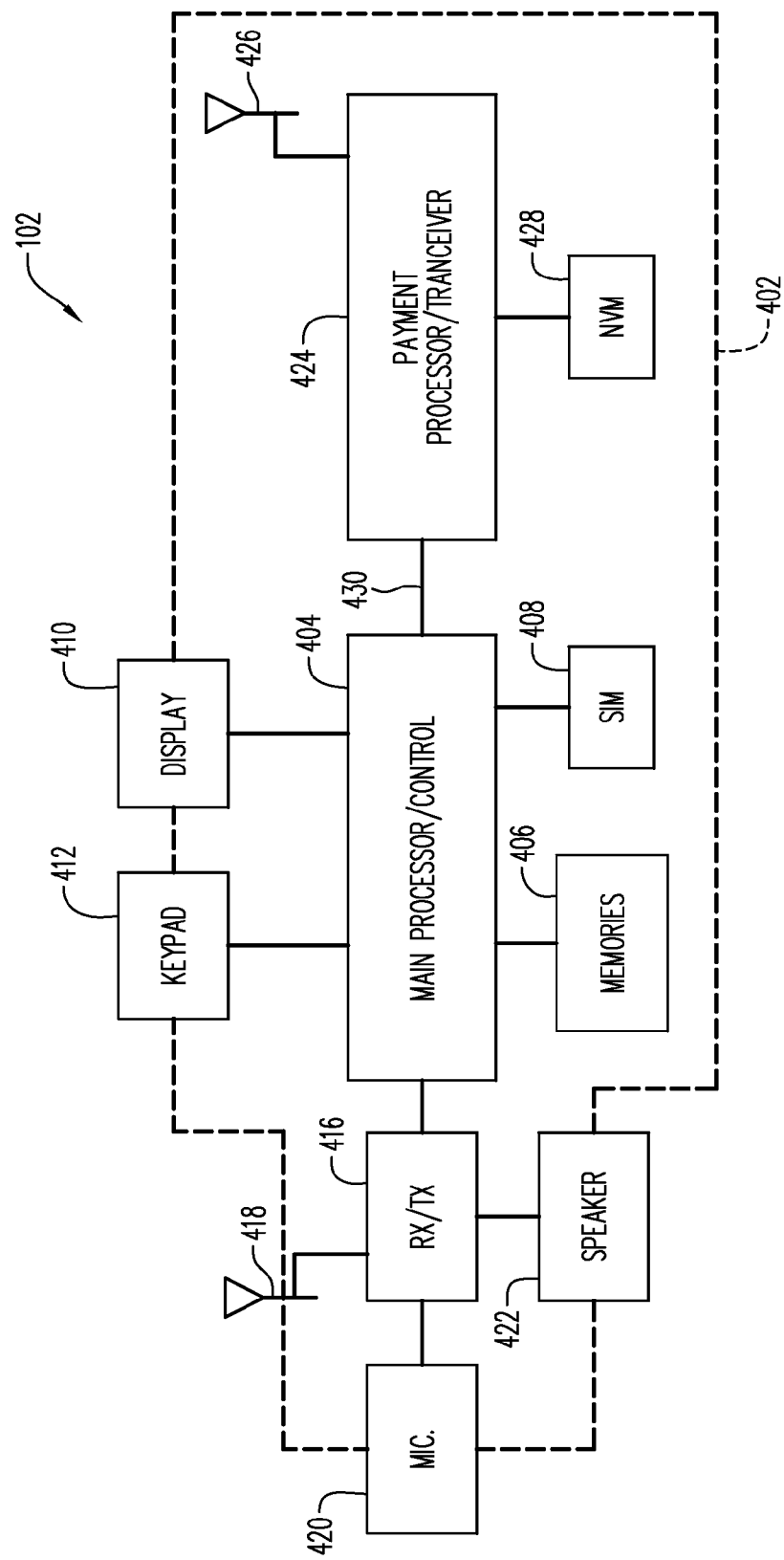
FIG. 4 is a block diagram that illustrates an example embodiment of a payment-enabled mobile telephone as shown in FIGS. 1-3.

FIG. 4 is a block diagram representation of the payment-enabled mobile telephone 102, as provided in accordance with aspects of the present invention. The payment-enabled mobile telephone 102 may be conventional in its hardware aspects. For example, the payment-enabled mobile telephone 102 may resemble, in most of its hardware aspects and many of its functions, a conventional "smart phone" such as the "iPhone" marketed by Apple Inc.

The payment-enabled mobile telephone 102 may include a conventional housing (indicated by dashed line 402 in FIG. 4) that contains and/or supports the other components of the payment-enabled mobile telephone 102. The housing 402 may be shaped and sized to be held in a user's hand, and may for example fit in the palm of the user's hand.

The payment-enabled mobile telephone 102 further includes conventional control circuitry 404, for controlling over-all operation of the payment-enabled mobile telephone 102. For example, the control circuitry 404 may include a conventional processor of the type designed to be the "brains" of a smart phone.

Other components of the payment-enabled mobile telephone 102, which are in communication with and/or controlled by the control circuitry 404, include: (a) one or more memory devices 406 (e.g., program and working memory, etc.); (b) a conventional SIM (subscriber identification module) card 408; (c) a keypad 412 for receiving user input; and (d) a conventional display component 410 for displaying output information to the user. For present purposes the keypad 412 will be understood to include, e.g., a conventional 12-key telephone keypad, in addition to other buttons, switches and keys, such as a conventional rocker-switch/select key combination, soft keys, and send and end keys.

As is now frequently the case with smart phones, the functionality represented by the display 410 and keypad 412 may be provided in an integrated manner via a conventional touch screen, which is not indicated in the drawing apart from blocks 410 and 412.

The payment-enabled mobile telephone 102 also includes conventional receive/transmit circuitry 416 that is also in communication with and/or controlled by the control circuitry 404. The receive/transmit circuitry 416 is coupled to an antenna 418 and provides the communication channel(s) by which the payment-enabled mobile telephone 102 communicates via the mobile telephone communication network (not shown). The receive/transmit circuitry 416 may operate both to receive and transmit voice signals, in addition to performing data communication functions.

The payment-enabled mobile telephone 102 further includes a conventional microphone 420, coupled to the receive/transmit circuitry 416. Of course, the microphone 420 is for receiving voice input from the user. In addition, a loudspeaker 422 is included to provide sound output to the user, and is coupled to the receive/transmit circuitry 416.

In conventional fashion, the receive/transmit circuitry 416 operates to transmit, via the antenna 418, voice signals generated by the microphone 420, and operates to reproduce, via the loudspeaker 422, voice signals received via the antenna 418. The receive/transmit circuitry 416 may also handle transmission and reception of text messages and other data communications via the antenna 418.

The payment-enabled mobile telephone 102 may also include a payment circuit 424 and a loop antenna 426, coupled to the payment circuit 424. The payment circuit 424 may include functionality that allows the mobile telephone 102 to function as a contactless payment device. In some embodiments, the payment circuit 424 includes a processor (not separately shown) and a memory (not separately shown) that is coupled to the processor and stores program instructions for controlling the processor. Although shown as separate from the main processor 404, the payment circuit 424 and/or its processor component may be integrated with the main processor 404. Thus, the functionality represented by the payment circuit may be largely implemented with a payment application program (not shown in FIG. 4), that controls a portion of the operations of the main processor 404. The control aspect of the payment circuit 424 may also control a transceiver (also represented by block 424) which handles the short-distance wireless communications via the antenna 426. In accordance with conventional practices, and in accordance with some embodiments, the mobile telephone may include a so-called "secure element" (not separately shown), which may be incorporated with the payment circuit 424, the main processor 404 or the SIM card 408. As is familiar to those who are skilled in the art, the secure element may be constituted with a small processor and volatile and nonvolatile memory (NVM; block 428) that are secured from tampering and/or reprogramming by suitable measures. The secure element may, for example, manage functions such as storing and reading out a payment card account number, and cryptographic processing.

As will be seen, the NVM 428 may store counter values and/or accumulator values that the payment-enabled mobile telephone 102 uses with respect to risk management activities.

The payment circuit 424 (to the extent it is a separate processor from main processor 404) may be in communication with the control circuitry 404 via a data communication connection 430.

Figure 5:
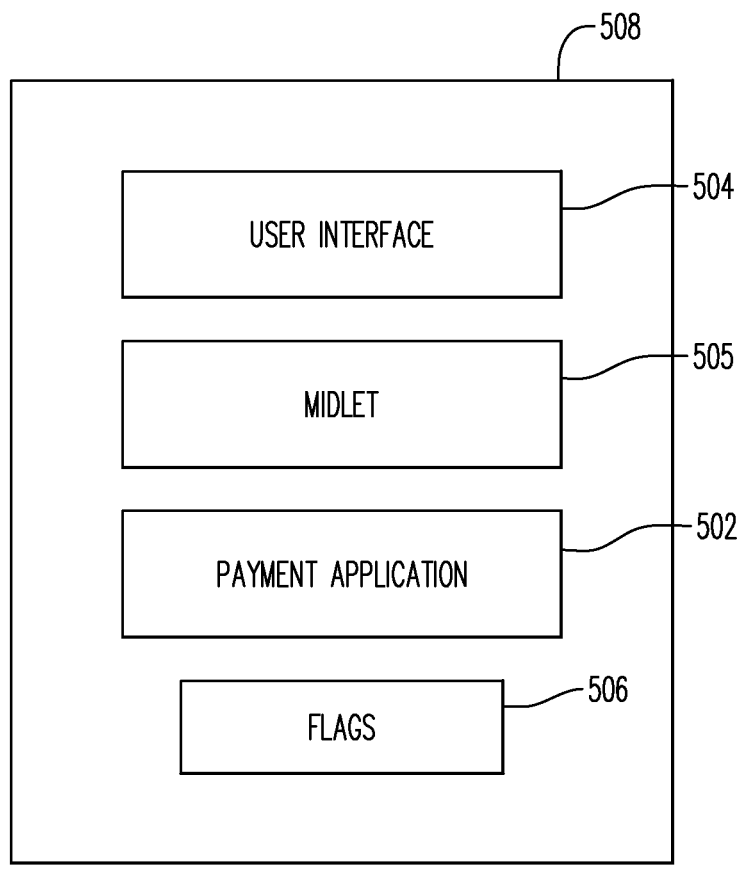
FIG. 5 is a block diagram that illustrates aspects of software and/or firmware programs that control the payment-enabled mobile telephone of FIG. 4.

FIG. 5 is a block diagram that schematically illustrates some software aspects of the payment-enabled mobile telephone 102. Block 502 in FIG. 5 represents the payment application program that was referred to above in conjunction with FIG. 4. In many respects the payment application program may be conventional, but in other respects it may implement risk management techniques as described below.

In some embodiments, the payment application program may be operable in either one of two modes, namely a payment mode and a management mode. The payment application may be in the payment mode when it is engaged in an exchange of communications with the proximity reader component 104 during a payment or purchase transaction; otherwise, it may be in the management mode. The latter mode may be used for activities in which the payment application is being configured, or is accepting input from the user (e.g., for cardholder verification), for top-ups/reloads, etc.

Block 504 in FIG. 5 represents user interface software that controls a portion of the operations of the main processor 404. For example, the user interface software 504 may receive input from, and control displaying of information on, the touch screen that was referred to above in conjunction with FIG. 4. The payment application program 502 and the user interface software 504 may interact with each other to allow the user to control and/or respond to the payment functionality of the payment-enabled mobile telephone 102. The interaction between the payment application program 502 and the user interface software 504 may be mediated by a software program 505 that may be referred to as a "midlet". The midlet 505 may interact with the user through the user interface (display/keyboard/touchscreen) via the user interface software to receive input such as ACK signals and/or PIN entry as described below. The midlet 505 may also interact with the card account issuer server computer via an over-the-air interface to reset one or more counters and/or accumulators. Moreover the midlet 505 may instruct the payment application program 502 as to how the payment application program is to be configured, in a management mode of the payment application program. Such instructions from the midlet 505 to the payment application program 502 may be based on information provided over the air to the midlet 505 from the issuer server computer.

Block 506 in FIG. 5 represents one or more flags that may be selectively set and/or cleared by the payment application program in connection with implementation of the risk management techniques described below.

The payment application program 502, the user interface software 504 and the risk management flags 506 depicted in FIG. 5 may each be stored in one or more of the memory devices referred to above in conjunction with FIG. 4. Such memory devices are collectively represented by block 508 in FIG. 5.

Figure 5A:
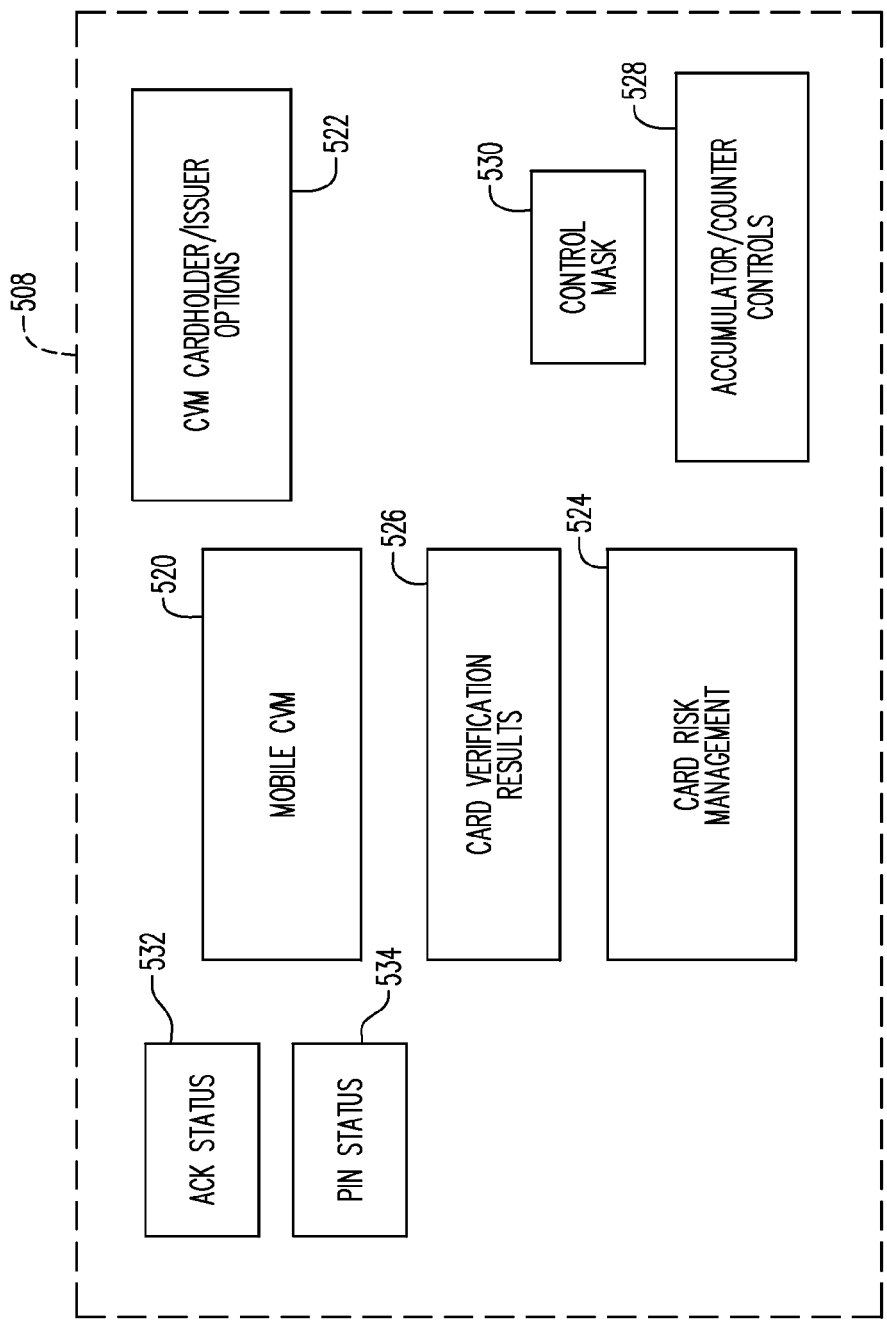
FIG. 5A is a block diagram that illustrates functionality provided in the payment-enabled mobile telephone relative to risk management techniques according to aspects of the present invention.

FIG. 5A is a block diagram that illustrates functionality provided in the payment application program 502 relative to risk management techniques according to aspects of the present invention.

In FIG. 5A, block 520 represents software capabilities in the payment-enabled mobile telephone 102 that allow the payment-enabled mobile telephone 102 to perform one or more cardholder verification methods (CVM). The cardholder verification methods may entail (as described below) prompting the user to enter a PIN, receiving the PIN digits as entered by the user, and verifying that the entered PIN digits match the PIN as previously stored in the payment-enabled mobile telephone 102. In addition or alternatively, other CVM techniques may be employed in the payment-enabled mobile telephone 102, such as biometric techniques that may include fingerprint reading or facial recognition.

Block 522 represents configuration flags or the like, input into the payment-enabled mobile telephone 102 by the payment card account issuer and/or the user to select one or more configuration options provided by the mobile CVM software 520. Examples of issuer- and/or user-selectable configuration options will be provided below.

Block 524 represents risk management software capabilities that may be implemented in the payment-enabled mobile telephone 102 apart from conventional issuer-centric risk management techniques. The "card-based" risk management software 524 may operate based on inputs such as the state of one or more transaction counters/accumulators maintained in the payment-enabled mobile telephone 102, security settings as input from the payment card account issuer, current transaction data (amount of transaction and/or the identification of the currency in which the transaction is being conducted), and results of CVM activities in the payment-enabled mobile telephone 102 relative to the current transaction.

Block 526 represents card verification results (CVR) which cumulate results of evaluation of one or more risk policies applicable to the operation of the payment application program. Among the risk policies involved there may be results of mobile cardholder verification (e.g., was the PIN entered correctly; was the ACK signal provided). Other risk policy results represented by the card verification results 526 may include whether one or more counters and accumulators exceeded applicable limits, whether the number of PIN retries was exceeded, etc. The card verification results 526 may be stored in one or more registers that serve as a bridge between the mobile CVM software 520 and the card risk management software 524. For example, the card verification results may include one or more flags to indicate whether required risk management inputs have been provided by the user as needed for the current transaction.

Block 528 represents software for controlling the above-referenced transaction counters/accumulators. Block 530 represents a control mask that is configurable by the issuer to select risk management policies to be applied in the payment-enabled mobile telephone 102. Block 532 represents a flag to indicate whether the user has duly acknowledged (ACK'd) the transaction information for the current transaction. Block 534 represents a flag to indicate whether the user has duly entered a valid PIN for the current transaction.

Block 508 again represents one or more of the memory devices that are part of the payment-enabled mobile telephone 102.

Figure 6:
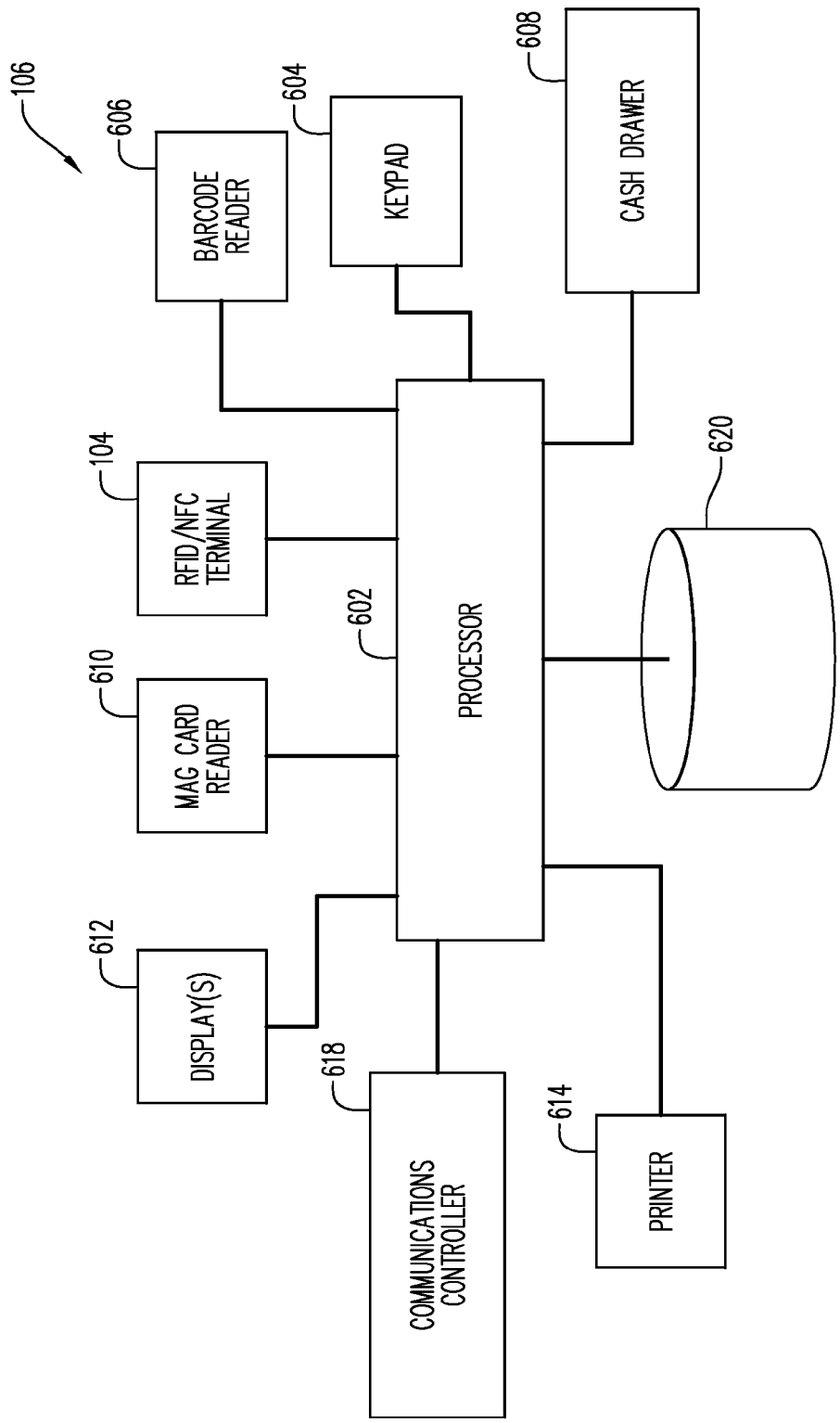
FIG. 6 is a block diagram representation of a typical POS terminal that may embody aspects of the present invention.

FIG. 6 is a block diagram of a typical embodiment of the POS terminal 106 depicted in FIG. 1 (and incorporating the proximity reader component 104—represented as an RFID/NFC terminal in FIG. 6). In some embodiments, the POS terminal 106 may be largely or entirely conventional in its hardware aspects. Nevertheless, the POS terminal 106 may be programmed in accordance with the aspects of the present invention to provide functionality as described herein.

The POS terminal 106 may include a processing element (or elements) such as the processor 602 shown in FIG. 6. The processor 602 may for example be a conventional microprocessor, and may operate to control the overall functioning of the POS terminal 106. The POS terminal 106 may also include conventional peripheral components, in communication with and/or controlled by the processor 602, such as: (a) a keypad 604 for receiving input from the human operator of the POS terminal; (b) a barcode reader 606 for reading product barcodes from products brought to the terminal for purchase; (c) a cash drawer 608 for storing cash received from customers; (d) a magnetic stripe reader 610 for reading payment card account numbers and related information from magnetic stripe payment cards; (e) one or more displays 612 for providing output (e.g., identifying products presented for purchase and their prices, indicating sales tax due, indicating transaction subtotals and totals, etc.); (f) a printer 614 for printing out sales receipts; (g) the above-mentioned proximity reader component 104, for exchanging wireless short range communications/near field communications (NFC) with contactless payment cards and/or with mobile telephones equipped with contactless payment device capabilities; and (h) a communication controller 618 for allowing the processor 602, and hence the POS terminal 106 to engage in communication over data networks with other devices (e.g., a merchant processing system (not shown), and an acquirer (FIG. 1) or its transaction processor (not shown)). (In some embodiments, at least one of the displays 612 may be a touch screen, so as to provide an input function as well as an output function.)

In addition, the POS terminal 106 may include one or more memory and/or data storage devices (indicated collectively at 620), which may comprise any combination of one or more of a hard disk drive, RAM (random access memory), ROM (read only memory), flash memory, etc. The memory/data storage device(s) 620 may store software and/or firmware that programs the processor 602 and the POS terminal 106 to perform functionality as described herein. Further, the POS terminal may include one or more housings (not shown) which contain and/or support one or more of the other components shown in FIG. 6.

Figure 7:
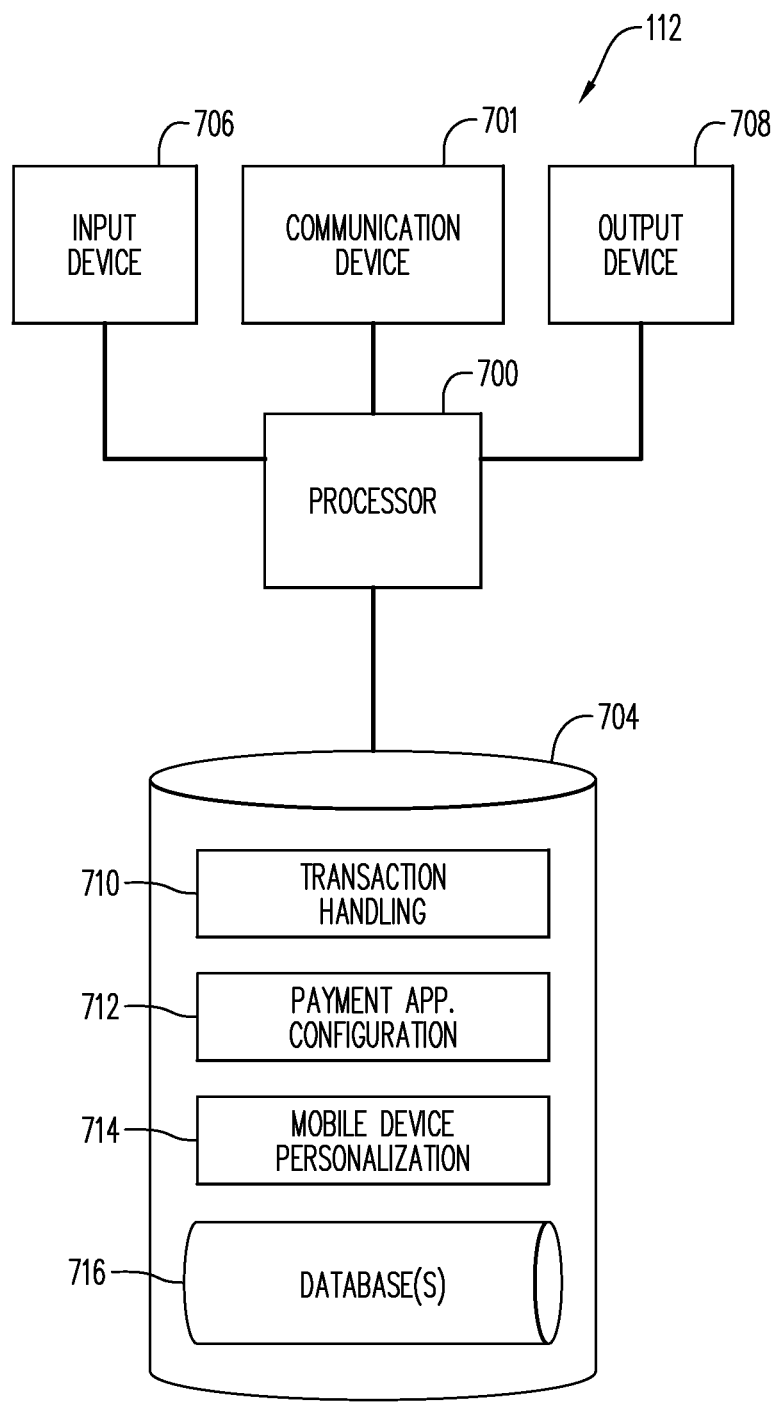
FIG. 7 is a block diagram representation of a server computer operated by a payment card account issuer and depicted as part of the system of FIG. 1.

FIG. 7 is a block diagram that illustrates an embodiment of the payment card issuer server computer 112 (FIG. 1).

The payment card issuer server computer 112 may be conventional in its hardware aspects but may be controlled by software to cause it to function as described herein. For example, the payment card issuer server computer 112 may be constituted by conventional server computer hardware.

The payment card issuer server computer 112 may include a computer processor 700 operatively coupled to a communication device 701, a storage device 704, an input device 706 and an output device 708.

The computer processor 700 may be constituted by one or more conventional processors. Processor 700 operates to execute processor-executable steps, contained in program instructions described below, so as to control the payment card issuer server computer 112 to provide desired functionality.

Communication device 701 may be used to facilitate communication with, for example, other devices (such as the payment system 110 or, as will be seen, the payment-enabled mobile telephone 102 via an over-the-air communication channel). For example, communication device 701 may comprise numerous communication ports (not separately shown), to allow the payment card issuer server computer 112 to communicate simultaneously with a number of other computers and other devices, including communications as required to simultaneously handle numerous transaction authorization requests from the payment system 110.

Input device 706 may comprise one or more of any type of peripheral device typically used to input data into a computer. For example, the input device 706 may include a keyboard and a mouse. Output device 708 may comprise, for example, a display and/or a printer.

Storage device 704 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 704 stores one or more programs for controlling processor 700. The programs comprise program instructions (which may be referred to as computer readable program code means) that contain processor-executable process steps of the payment card issuer server computer 112, executed by the processor 700 to cause the payment card issuer server computer 112 to function as described herein.

The programs may include one or more conventional operating systems (not shown) that control the processor 700 so as to manage and coordinate activities and sharing of resources in the payment card issuer server computer 112, and to serve as a host for application programs (described below) that run on the payment card issuer server computer 112.

The programs stored in the storage device 704 may also include a transaction handling application program 710 that controls the processor 700 to enable the payment card issuer server computer 112 to handle various transactions, including authorization requests for payment card system purchase transactions.

Another program that may be stored in the storage device 704 is an application program 712 that selects configuration options for payment application programs loaded or to be loaded in the payment-enabled mobile devices that operate with the system 110 (FIG. 1).

The programs stored in the storage device 704 may also include an application 714 that programs the payment card issuer server computer 112 to manage personalization of mobile telephones (and possibly other payment devices as well) authorized by the issuer to access payment card accounts issued by the issuer. The payment card issuer server computer 112 may perform conventional personalization functions in addition to the operations described herein. (Or, in other embodiments, the personalization and payment application configuration functions may be handled by another computer—operated by or on behalf of the issuer—that is separate from, but possibly cooperative with, the payment card issuer server computer 112.)

The storage device 704 may also store, and the payment card issuer server computer 112 may also execute, other programs, which are not shown. For example, such programs may include a billing application, which handles generation of bills to users and which tracks whether payments are received as required. The other programs may also include, e.g., device drivers, etc.

The storage device 704 may also store one or more databases 716 required for operation of the payment card issuer server computer 112, including data regarding users' payment card account balances and transactions.

Figure 8:
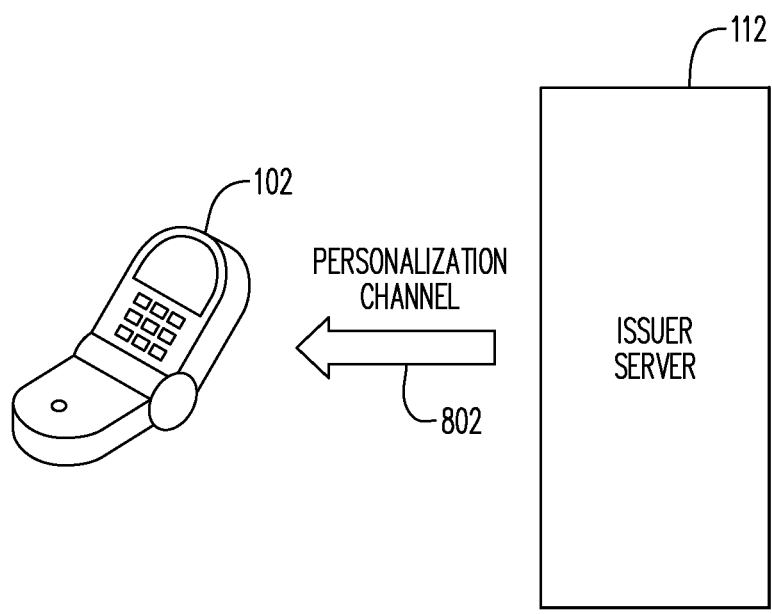
FIG. 8 schematically illustrates a process for personalizing a payment-enabled mobile telephone.

FIG. 8 schematically illustrates personalization of payment-enabled mobile telephone 102 for payment enablement purposes. As before, block 112 represents a server computer operated by or on behalf of an issuer (financial institution) of payment card accounts. The payment card issuer server computer 112 is the source of information that is loaded into the payment-enabled mobile telephone 102 for the purpose of "personalizing" the payment-enabled mobile telephone 102. Arrow 802 schematically illustrates a communication channel by which the personalization information is transmitted from the payment card issuer server computer 112 to the payment-enabled mobile telephone 102.

As is familiar to those who are skilled in the art, "personalization" refers to the process by which user- and/or account-specific information is loaded into and/or otherwise applied to a payment device (e.g., a contactless payment card or payment-enabled mobile telephone or mag stripe payment card). In connection with traditional mag stripe payment cards, the personalization process includes magnetically storing the cardholder's name and the payment card account number and other information on the mag stripe, and also printing/embossing the cardholder's name and account number, etc., on the plastic body of the card. For a conventional contactless payment card, personalization may include similar printing or embossing, plus storage of cardholder name and account number and other information by RF wireless communication into an integrated circuit (IC) embedded in the body of the contactless payment card.

Personalization of a payment-enabled mobile telephone also entails storage of information in an IC contained within the phone. According to one conventional proposal, the information is communicated to the mobile telephone over the air (OTA) via the mobile communication network by a data communication session between the mobile telephone and the issuer's server. It has also been proposed that personalization of the mobile telephone may include the downloading to the mobile telephone of the payment application program.

The above-mentioned OTA communication channel may be one embodiment of the personalization channel 802 shown in FIG. 8. According to another proposal (and as disclosed in co-pending and commonly assigned U.S. patent application Ser. No. 11/870,144—published as U.S. Publication No. 2009/0100511), the personalization information for a particular user's mobile telephone is loaded into a contactless IC card from the issuer's server computer and then the contactless IC card is sent to the user. The user/cardholder then brings the contactless IC card into proximity with the mobile telephone to permit loading of the personalization information via RF communication from the IC card to the mobile telephone. This technique is another possible embodiment of the personalization channel 802 shown in FIG. 8. The contactless IC card described in this paragraph, into which programs and/or data are loaded to in turn be loaded into a mobile telephone or other device, may hereinafter be referred to as a "personalization card" or "perso card", for short.

In other embodiments, the personalization channel 802 may be constituted by any other personalization technique previously or hereafter proposed.

In some embodiments, the personalization (or "pre-personalization") of a payment-enabled mobile telephone by the issuer server 112 may include loading the payment application program into the payment-enabled mobile telephone and/or configuration of the payment application program to select among risk management practices described herein.

Figure 9A:
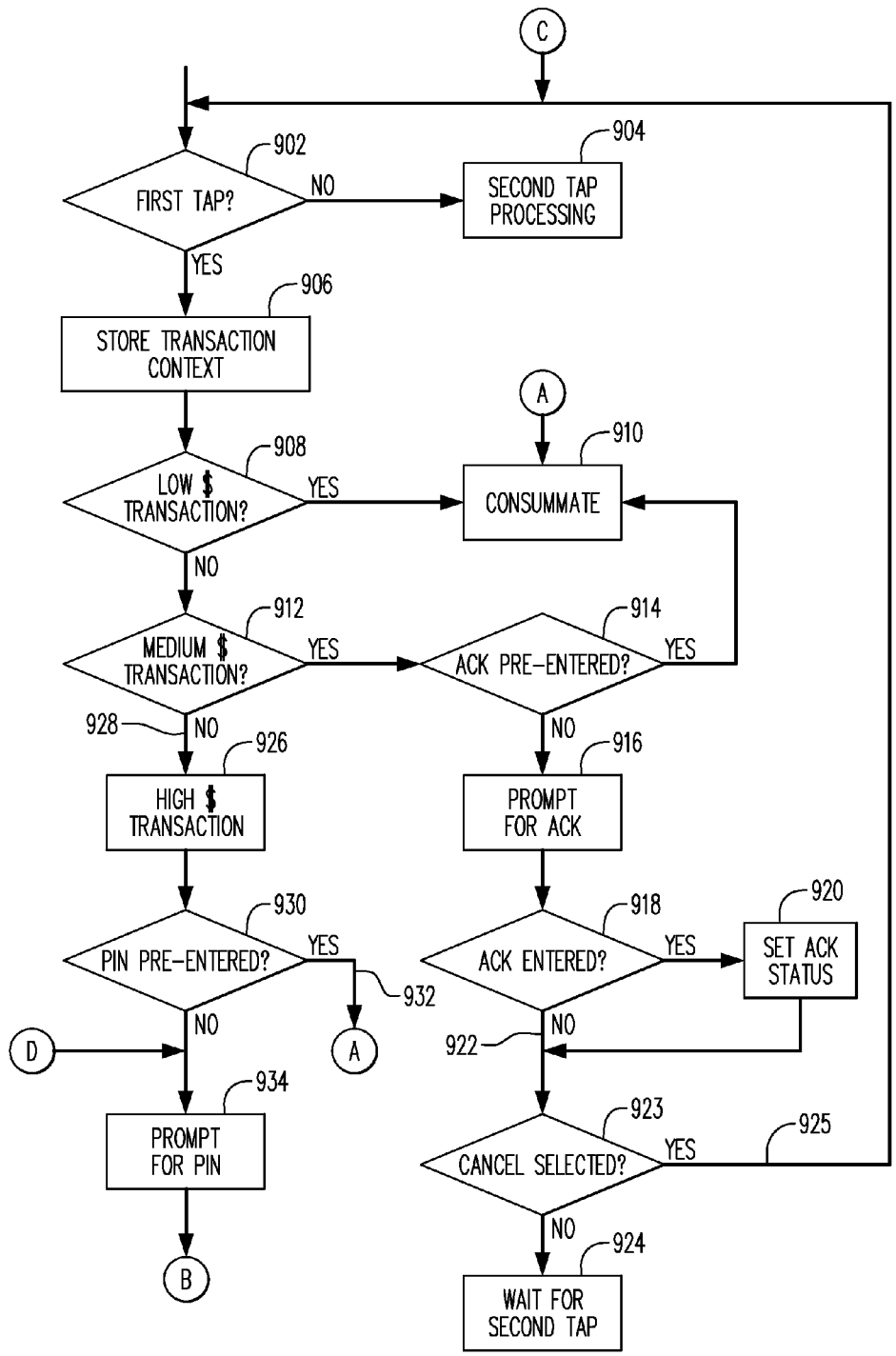
FIGS. 9A and 9B together form a flow chart that illustrates a process that may be performed in the system of FIG. 1 according to aspects of the present invention.
Figure 9B:
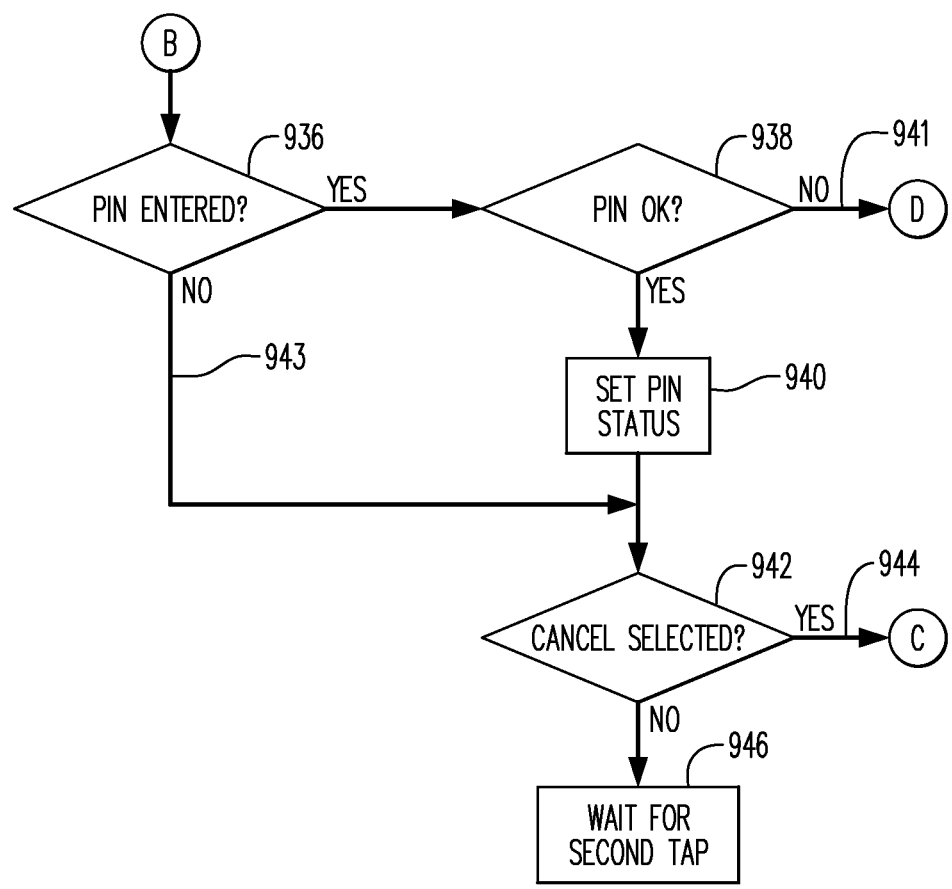

FIGS. 9A and 9B together form a flow chart that illustrates a process that may be performed in the system 100 according to aspects of the present invention. In particular, FIGS. 9A and 9B illustrate operation of the payment-enabled mobile telephone 102 and functionality provided by the payment application program 502 (FIG. 5) in the payment-enabled mobile telephone 102 in cooperation with the user interface program 504. To briefly summarize aspects of this process, the payment application program may apply various different cardholder verification or transaction acknowledgement requirements depending on one or more attributes of the current transaction. In the particular example depicted in FIGS. 9A and 9B, there are three categories of transaction—defined by transaction amount—for which different requirements (or the absence of any required action) are assigned. The cardholder verification requirement may protect against misuse of the payment capabilities of the payment-enabled mobile telephone 102. The transaction acknowledgment requirement may protect against unauthorized reading of the user's account information from the payment-enabled mobile telephone 102, and may help to assure that the transaction as defined by the merchant complies with what the user believes the transaction to be.

The process of FIGS. 9A and 9B may idle in an inactive state, until the payment-enabled mobile telephone 102 detects that it has been tapped on the proximity reader component 104 of a POS terminal. Then, at decision block 902, the payment application program determines whether this is the first time the payment-enabled mobile telephone 102 has been tapped on the proximity reader component 104 (resulting in an exchange of wireless communication) in connection with the current transaction. This determination may be made for example, by referring to a flag that indicates whether the payment application program is already storing transaction context data (e.g., a transaction amount and currency identifier). If transaction context data is already present, then the process advances from decision block 902 to block 904. Block 904 represents what will be referred to herein as "second tap processing", as will be described below in connection with FIG. 12.

If, on the other hand, it is determined at decision block 902 that the exchange of communications with the proximity reader component 104 is for a "first tap", then the process advances from decision block 902 to block 906. At block 906, the payment application program stores the transaction context data for the current transaction, as received at the "first tap" from the POS terminal 106. As noted above, in some embodiments, the transaction context data may include or consist of the transaction amount and an indication (e.g., a code) that identifies the currency in which the transaction is being conducted.

The payment application program then determines, based on the transaction amount, the transaction amount category into which the transaction falls. Thus, at decision block 908, the payment application program determines whether the transaction is a "low dollar (monetary amount)" transaction, say not more than ten dollars. If so, then the payment application program allows the transaction to be consummated at the first tap. That is, it is assumed that the processing for steps 902, 906, 908, 910 occurs while the payment-enabled mobile telephone 102 remains in proximity to the proximity reader component 104 during the first tap, and that the resulting exchange of communications involves the payment-enabled mobile telephone 102 communicating the user's payment card account number to the proximity reader component 104. Consummation of the transaction is indicated at block 910.

Decision block 912 represents a determination by the payment application program as to whether the transaction is for a "medium dollar" amount, say more than ten dollars but not more than 20 dollars. If so, the applicable risk management requirement may call for the user to "acknowledge" (ACK; i.e., enter input to accept) the transaction. In some embodiments, ACK/acceptance may be pre-entered prior to the first tap for a transaction. Accordingly, when the transaction is for a "medium dollar" amount, the process may advance from decision block 912 to decision block 914. At decision block 914, the payment application program determines whether in fact the user has pre-entered "ACK". If so, the process consummates the transaction on the first tap, such that block 910 follows decision block 914 in this case. Otherwise, the process advances from decision block 914 to block 916.

Figure 10:
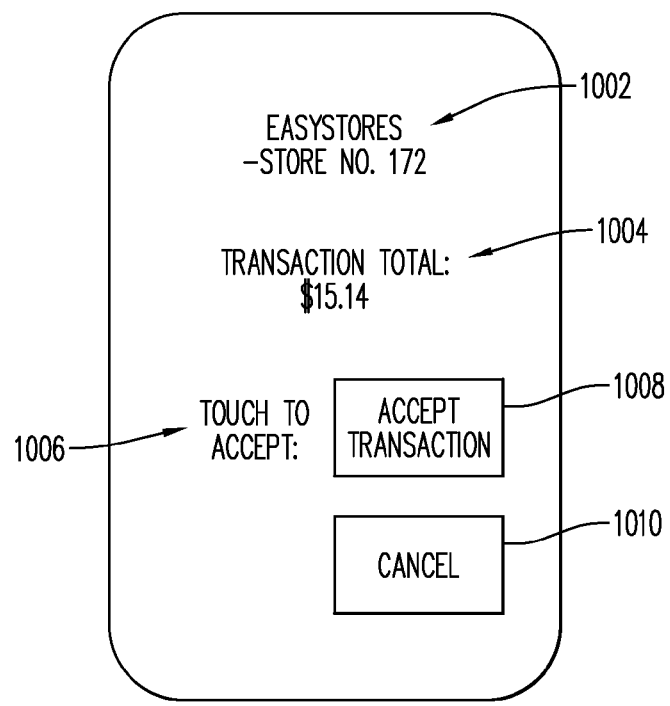
FIGS. 10 and 11 are example screen displays that may be provided by the payment-enabled mobile telephone in connection with transactions performed in accordance with the process of FIGS. 9A and 9B.

At block 916, the payment-enabled mobile telephone 102 displays a prompt to the user to indicate that the user needs to accept the transaction. FIG. 10 shows an example screen display that may be displayed to the user in this case (it is assumed that the payment-enabled mobile telephone 102 includes a touch screen on which this screen display is presented). Referring to FIG. 10, the name of the retailer (entity that operates the POS terminal 106) is indicated at 1002. The amount of the transaction is displayed at 1004. (The "$" sign identifies the currency.)

At 1006, the payment-enabled mobile telephone 102 displays the prompt to the user to accept/ACK the transaction. The user is to do so by actuating (touching) the virtual "accept" button which appears at 1008. (Alternatively, e.g., in cases where the payment-enabled mobile telephone 102 does not have a touch screen, the user may have the option of signaling ACK by actuating a soft key or in another conventional manner.) If the user wishes to cancel the transaction, he/she may do so by touching the "cancel" button 1010, which is also provided as part of the screen display.

Referring again to FIG. 9A, at 918 the payment application determines whether the user has ACK'd. If so, then block 920 follows decision block 918. At block 920 the payment application program sets a flag to indicate that a required ACK/accept indication has been received from the user. If the ACK indication is not received, then the process branches at 922 from decision block 918, such that the process by-passes block 920 (and so does not set the ACK status flag). At decision block 923, it is determined whether the user has actuated the "cancel" button (FIG. 10). If so, the transaction is aborted and the process loops back (via branch 925) to decision block 902. Otherwise, the process awaits a second tap (block 924). (In some embodiments, there may also be a time out function, such that the process aborts and loops back to 902 if the second tap or the ACK indication do not occur within a predetermined period of time.) (To partially preview the process of FIG. 12, if ACK was required but the ACK status flag was not set, any second tap will result in the payment-enabled mobile telephone 102 declining the transaction. The process may then be repeated with a third (or fourth, etc.) tap until the ACK is received or the transaction is canceled by the user.)

Referring again to decision blocks 908 and 912 in FIG. 9A, if the payment application program determines that the transaction is neither a low nor a medium dollar amount application, then the payment application program determines that the transaction is a high dollar amount transaction, as indicated at block 926 (following the "no" branch 928 from decision block 912). Decision block 930 then follows block 926.

At decision block 930, the payment application program determines whether the user had pre-entered his/her PIN (and that the PIN had been verified by the payment application program). If so, then the process consummates the transaction on the first tap, such that block 910 follows decision block 930 (via branch 932 from block 930). Otherwise, the process advances from decision block 930 to block 934.

Figure 11:
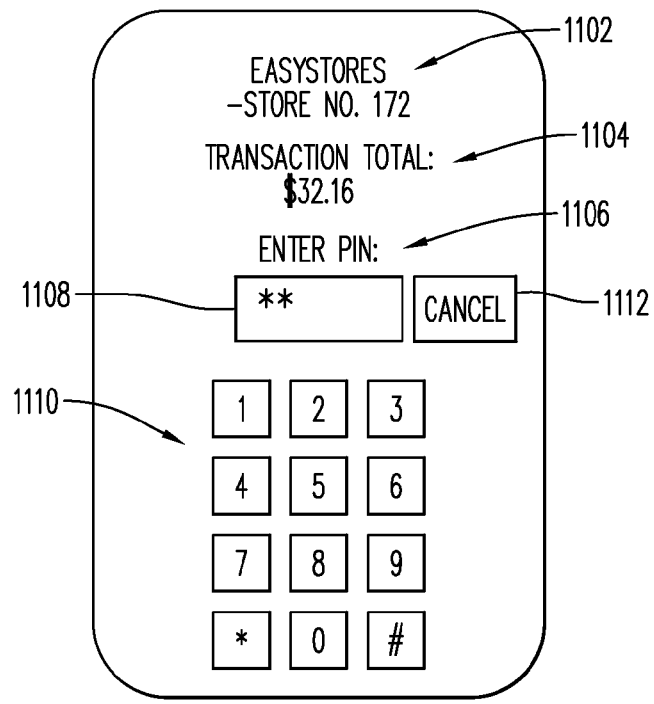

At block 934, the payment-enabled mobile telephone 102 displays a prompt to the user to indicate that the user needs to enter his/her PIN. FIG. 11 shows an example screen display that may be displayed to the user in this case (as with FIG. 10, it is again assumed that the screen display is shown on a touch screen component of the payment-enabled mobile telephone 102).

Referring to FIG. 11, the retailer is identified at 1102 and the amount of the transaction (with currency indication) is displayed at 1104. The actual "enter PIN" prompt appears at 1106 and a field 1108 is also provided to acknowledge entry of each digit of the PIN. A virtual numeric keypad is displayed at 1110 to permit the user to enter the digits of the PIN. (In alternative embodiments, for example, in the absence of a touch screen/virtual keypad, the user may operate an actual numeric keypad on the phone in order to enter the digits of the PIN.) A "cancel" button is provided at 1112.

Referring again to FIGS. 9A and 9B, it will be noted that decision block 936 in FIG. 9B follows block 934 shown in FIG. 9A. At decision block 936, the payment application program determines whether the PIN has been entered, and if so, decision block 938 (FIG. 9B) follows decision block 936. At decision block 938, the payment application program determines whether the PIN, as entered by the user, is valid. For example, the payment application program may compare the PIN as entered with a version of the PIN that has been securely stored (e.g., in a tamper-resistant memory) in the payment-enabled mobile telephone 102. If the payment application program determines that the PIN as entered is valid, then block 940 follows decision block 938. At block 940, the payment application program sets a flag to indicate that the user has entered the PIN and that the PIN as entered has been verified. But if the user does not enter the PIN or the PIN is incorrect, then the process of FIGS. 9A and 9B by-passes block 940 so that the PIN verification status flag is not set. In this example as illustrated in the drawings, invalid entry of the PIN causes the process to loop back to block 934 (FIG. 9A), via branch 941 from decision block 938, so that the user is prompted to try again to enter the PIN (it will be recognized that a "try again" variation on the screen display of FIG. 11 may be employed). In some embodiments, the number of retries that is permitted may be limited by the payment application program. Also in the example shown in FIGS. 9A and 9B, the process branches at 943 from decision block 936 to decision block 942 (FIG. 9B) if the PIN has not been entered, by-passing block 940. (In other cases, decision block 942 follows blocks 938 and 940.) At decision block 942, it is determined whether the user has actuated the cancel button. If so, the process loops back to decision block 902 (FIG. 9A) via branch 944 from decision block 942. Otherwise, at block 946, the process awaits a second tap of the payment-enabled mobile telephone 102 on the proximity reader component. Again, a time-out function may be in effect to abort the transaction in the absence of any action from the user. As will be seen from the ensuing discussion of FIG. 12, if PIN entry was required and did not validly occur, then the second tap results in the transaction being declined. The process may then be repeated with a third (or fourth, etc.) tap until the PIN is entered or the transaction is canceled by the user.

Figure 12:
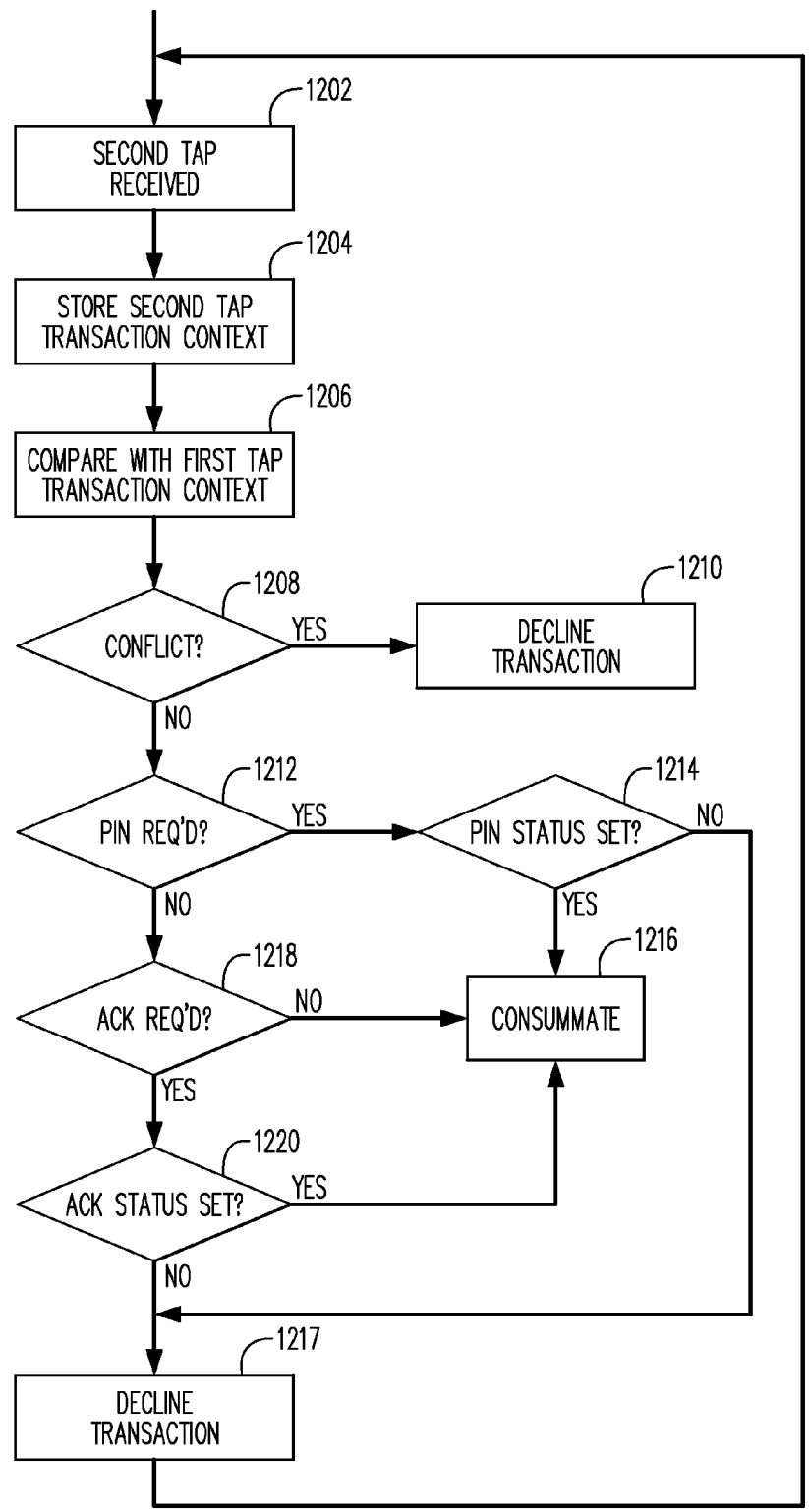
FIG. 12 is a flow chart that illustrates another process that may be performed in the system of FIG. 1 according to aspects of the present invention.

FIG. 12 is a flow chart that illustrates a process for handling a "second tap". The process of FIG. 12 begins with block 1202, at which the second tap occurs. Once this takes place, the process advances from block 1202 to block 1204. At block 1204, the payment application program again receives the transaction context data (e.g., dollar amount and currency) from the POS terminal 106. In normal cases, the context data received at 1204 is the same as the data stored at the first tap (block 906, FIG. 9A)—that is, the second tap is for the same transaction as the first tap. However, to prevent or deter certain kinds of attacks on the payment system, it is advisable that the payment application program be configured to compare the second tap transaction context with the first tap transaction context. This step is indicated at 1206 in FIG. 12. The payment application program then determines at decision block 1208 whether there is a conflict between the first and second tap transaction contexts. If so, then the payment application program declines the transaction, as indicated at block 1210. Normally, however, there will be no conflict, and in those cases the process advances from decision block 1208 to decision block 1212.

(The transaction context data stored in the payment-enabled mobile telephone 102 between taps, in addition to currency and transaction amount, may include an indication that the payment application program is awaiting a second tap, an indication as to whether a PIN or ACK was entered, and whether a "L&S" counter or accumulator—described below in conjunction with FIG. 19—has exceeded its limit.)

At decision block 1212, the payment application program determines whether PIN entry was required in connection with the first tap (a suitable flag indicating that PIN entry/CVM was required may have been set in connection with the first tap). If PIN entry was required, then the process advances from decision block 1212 to decision block 1214. At decision block 1214, the payment application program determines whether the PIN verification status flag is set. If so, the transaction is consummated as indicated at block 1216 (i.e., the payment-enabled mobile telephone 102/payment application program transmits to the POS terminal 106 the commitment of the user's payment card account number to the transaction and possibly certain security procedures are performed). If the PIN verification status flag is not set, then the payment application program declines the transaction (block 1217) and the process may then loop back to block 1202 (awaiting a second tap).

Referring again to decision block 1212, if the payment application program determines that PIN entry was not required in response to the first tap, then the process advances from decision block 1212 to decision block 1218. At decision block 1218, the payment application program determines whether user acceptance/acknowledgement (ACK) was required in connection with the first tap (again a suitable flag indicating the ACK requirement may have been set in connection with the first tap). If so, then the process advances from decision block 1218 to decision block 1220. At decision block 1220, the payment application program determines whether the ACK status flag is set. If so, block 1216 (transaction consummation) follows decision block 1220. Otherwise, block 1217 (transaction declined) follows decision block 1220.

In the example embodiments illustrated with FIGS. 9-12, one class of transactions is handled with one tap of the payment-enabled mobile telephone 102 on the proximity reader component of the POS terminal 106; a second class of transactions requires two taps, with an ACK by the user between the two taps; and a third class of transactions requires two taps, with PIN entry and verification between the two taps. In this example, the transaction classes were defined in terms of transaction amounts, but other transaction class definitions are possible. For example, all and only gasoline service station at-the-pump transactions may be one tap, all other domestic currency transactions may be two-tap with ACK required, and all foreign currency transactions (other than at-the-pump) may be two-tap with PIN required. Those who are skilled in the art will recognize that many other definitions of three transaction categories may be implemented. To provide one other example, in some embodiments, "zero" monetary amount transactions (e.g., transit entry transactions) may be "one tap" transactions, non-zero transactions below a monetary amount limit may be two-tap-with-ACK transactions, and transactions at or above the monetary amount limit may be two-tap-with-PIN transactions.

Figure 13:
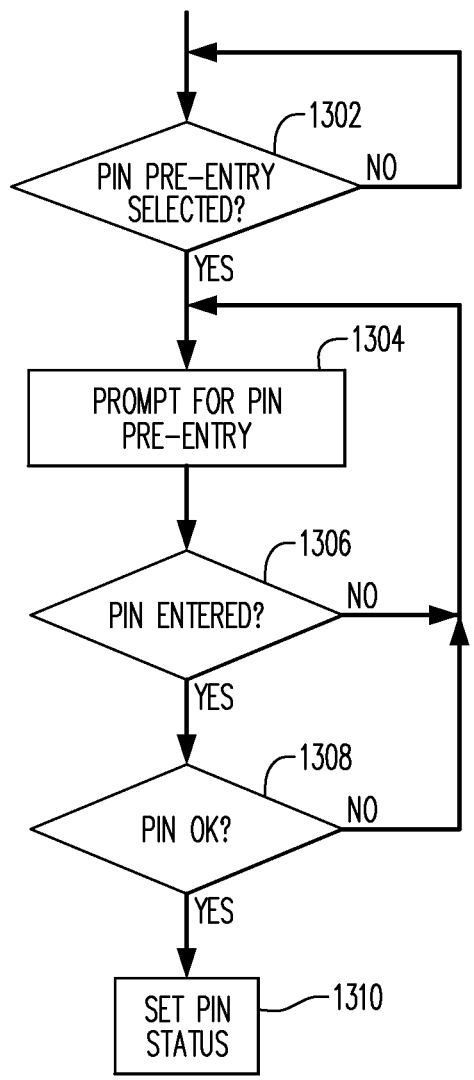
FIGS. 13-15 are further flow charts that illustrate processes that may be performed in the system of FIG. 1 according to aspects of the present invention.
Figure 14:
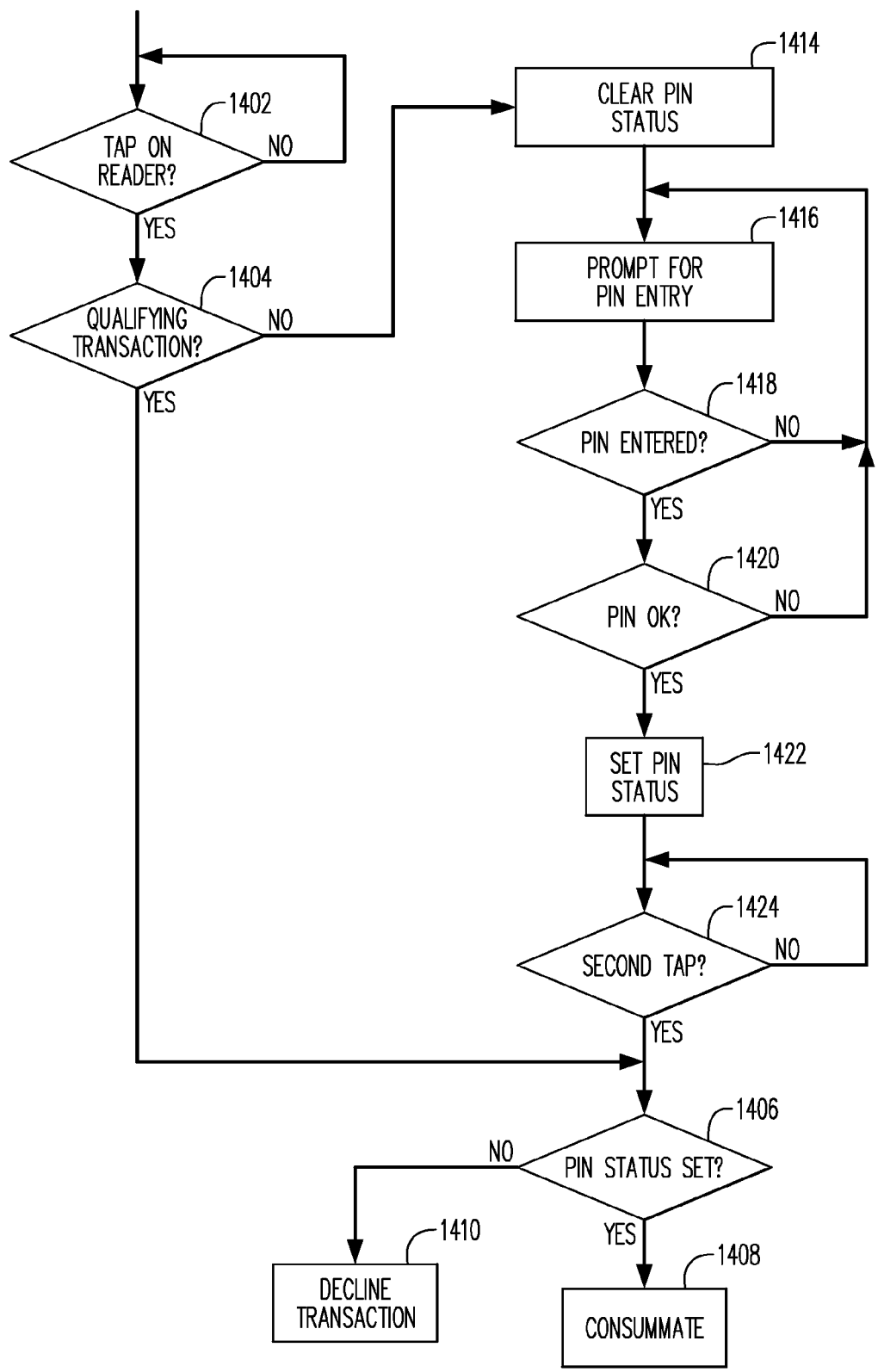

FIGS. 13 and 14 are each flow charts that illustrate additional processes that may be implemented in the payment-enabled mobile telephone 102 in accordance with aspects of the invention via the payment application program. One advantage provided with the processes of FIGS. 13 and 14 is that a payment card account issuer may be permitted to specify classes of transactions for which PIN pre-entry is or is not allowed. For example, an issuer may allow PIN pre-entry only for transit system transactions, and may require two taps with PIN entry after the first tap and before the second for all other transactions.

Referring then to FIG. 13, at decision block 1302, the process of FIG. 13 idles until the user invokes a PIN pre-entry function on the payment-enabled mobile telephone 102. (For example, the user may select this function by interacting with a menu provided on the display component of the payment-enabled mobile telephone 102.) Upon the user selecting the PIN pre-entry function, the process advances from decision block 1302 to block 1304. At block 1304, the payment-enabled mobile telephone 102 may prompt the user to pre-enter his/her PIN. For example, this could be done with a screen display that resembles FIG. 11, except with a legend/heading such as "PIN PRE-ENTRY" replacing elements 1102 and 1104 in the screen display of FIG. 11.

Decision block 1306 follows block 1304 in FIG. 13. At decision block 1306, the payment-enabled mobile telephone 102 (e.g., the user interface program and/or the payment application program) determines whether the PIN has been entered. If so, decision block 1308 follows decision block 1306. At decision block 1308, the payment application program determines whether the PIN, as entered by the user, is valid. This process step may resemble step 938 in FIG. 9B, as described above.

If the PIN is found to be valid, then block 1310 follows decision block 1308. At block 1310, the payment application program sets the PIN verification status flag to indicate that the user has entered the PIN and the PIN as entered was verified.

Referring again to decision blocks 1306 or 1308, if the PIN is not entered or is invalid, the process may loop back to block 1304. (This loop may be subject to a time-out function.)

Typically, the process of FIG. 13 is likely to be performed at the user's instigation at a time just before the user taps the payment-enabled mobile telephone 102 on a proximity reader component to initiate a payment/purchase transaction. FIG. 14 then picks up the sequence of events in response to the tapping of the payment-enabled mobile telephone 102 on the proximity reader component.

The process of FIG. 14 idles, as indicated by decision block 1402, until the "tap" occurs. When the tap takes place, the process of FIG. 14 advances from decision block 1402 to decision block 1404. At decision block 1404, the payment application program determines whether the transaction (as identified by the information received from the proximity reader component) is qualified for handling via pre-entry of the user's PIN. If so, the process of FIG. 14 advances from decision block 1404 to decision block 1406.

At decision block 1406, the payment application program determines whether the PIN verification flag is in its "set" state (as will be the case if step 1310 in FIG. 13 has been executed.) If the PIN verification flag has been set, the payment-enabled mobile telephone 102 consummates the transaction (block 1408) as part of the exchange of communications with the proximity reader component in connection with the "tap" detected at 1402. If the PIN verification flag has not been set and if the PIN is required for the transaction (for example, if it is a high value transaction), then the payment-enabled mobile telephone 102 declines the transaction (block 1410). Alternatively, in a branch not shown in the drawing, the process may segue to a sequence of steps like those led by block 934 in FIG. 9A.

Considering decision block 1404 again, if at that point in the process the payment application program determines that the transaction is not one that qualifies for PIN pre-entry, then the process of FIG. 14 advances from decision block 1404 via branch 1412 to block 1414. At block 1414, the payment application program clears the PIN verification status flag. (It should be understood that the PIN verification flag may already be in a non-set—i.e., cleared—state at the time the process arrives at block 1414, in which case the action at block 1414 does not change the state of the PIN verification flag.)

The process of FIG. 14 advances from block 1414 to block 1416. At block 1416, the payment-enabled mobile telephone 102 may prompt the user to enter his/her PIN if the PIN is required for the transaction (for example, if it is a high value transaction). Again, a screen display like that shown in FIG. 11 may accordingly be presented to the user by the payment-enabled mobile telephone 102.

Decision block 1418 follows block 1416 in FIG. 14. At decision block 1418, the payment application program determines whether the PIN has been entered. If so, decision block 1420 follows decision block 1418. At decision block 1420, the payment application program determines whether the PIN, as entered by the user, is valid. (Again this may be done as described with reference to block 938 in FIG. 9B.)

If the payment application program determines at decision block 1420 that the entered PIN is valid, then block 1422 follows decision block 1420. At block 1422, the payment application program sets the PIN verification flag. Next, at decision block 1424, the payment application program awaits the "second tap" of the payment-enabled mobile telephone 102 on the proximity reader components. Once this occurs, the process of FIG. 14 advances from decision block 1424 to decision block 1406, etc., as described above.

Referring again to decision blocks 1418 and 1420, if no PIN is entered, or the PIN as entered is incorrect, the process may loop through blocks 1416, 1418 and/or 1420. This loop may be subject to a time-out function and/or a limit on the number of re-tries for entering the PIN.

Processes similar to those of FIGS. 13 and 14 may be implemented for pre-entry of ACK, and the issuer and/or the user may specify a class or classes of transaction for which ACK pre-entry is permitted or not permitted.

Figure 15:
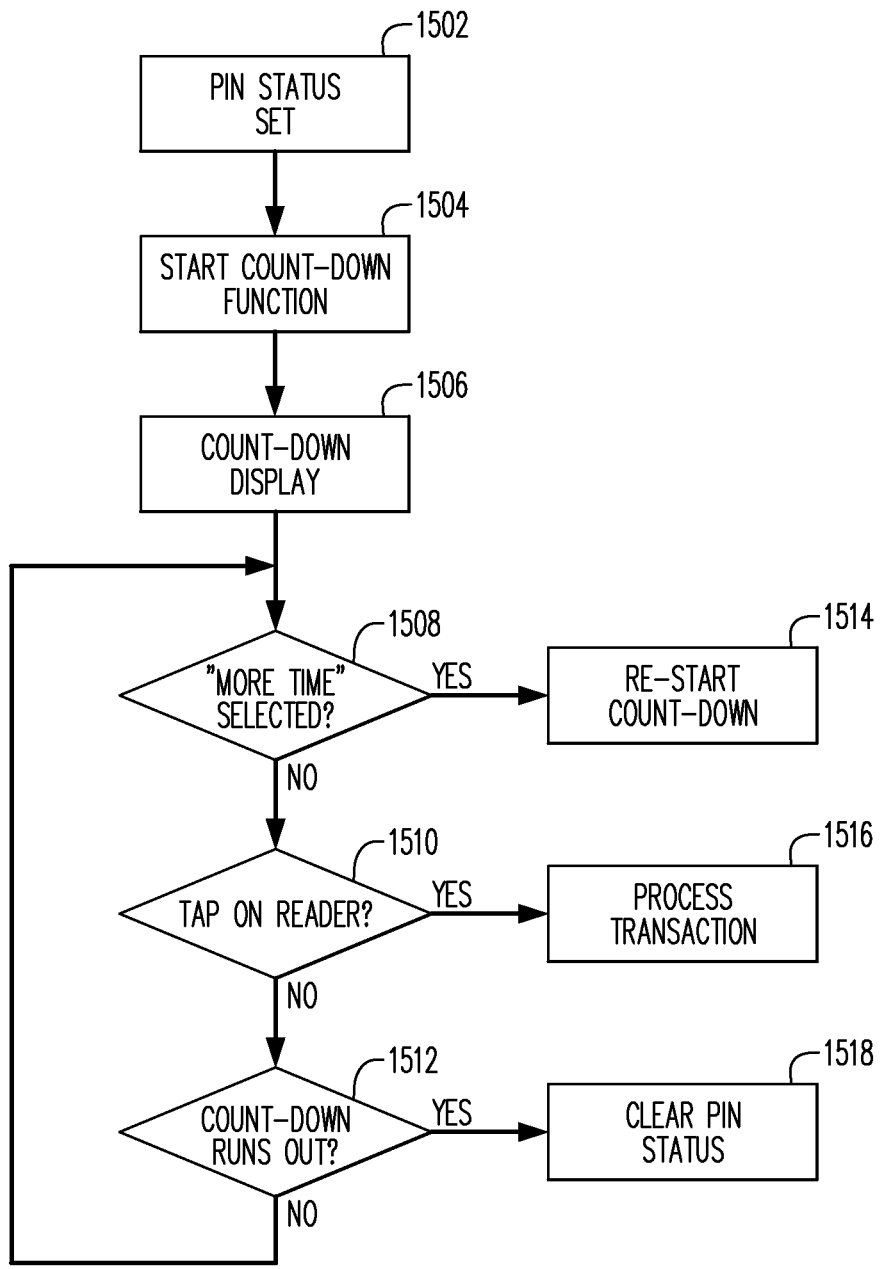

FIG. 15 illustrates still another process that may be implemented in the payment-enabled mobile telephone 102 in accordance with aspects of the present invention. In some embodiments, the process of FIG. 15 may be interposed between the processes of FIG. 13 and FIG. 14 and/or between steps 1422 and 1424 in FIG. 14.

FIG. 15 is relevant to embodiments in which the PIN verification flag is allowed to be in a set condition only for a limited period of time after the payment application program verifies a PIN as entered by the user. This limited period of time may, for example, be enforced by a (software based) count-down timer function that begins operation when the PIN verification flag is initially set and that causes the PIN verification flag to be cleared when the count-down timer reaches zero. An advantage provided by the process of FIG. 15 is to improve user friendliness of the payment-enabled mobile telephone 102 by informing the user how much time he/she has left before the PIN verification status expires.

Referring then to FIG. 15, the process begins with block 1502, upon setting of the PIN verification status flag (as in, e.g., block 1422 in FIG. 14, block 1310 in FIG. 13, or block 940 in FIG. 9B). Block 1504 then follows block 1502. At block 1504, the payment-enabled mobile telephone 102 starts a count-down timer function with respect to the PIN verification flag. For example, the timer function may start at "6 minutes" (6:00) and may count down from there toward zero. The current value of the count-down timer function indicates a future point in time at which the PIN-verified status of the payment application program will expire.

Block 1506 follows block 1504. At block 1506, the payment-enabled mobile telephone 102 may provide to the user a screen display such as that shown in FIG. 16. It will be noted that the screen display includes a prompt at 1602 to the user to tap the payment-enabled mobile telephone 102 to complete (or initiate) the current transaction. The screen display of FIG. 16 also includes a field 1604 which displays the current value of the count-down timer function. The display may be dynamic in that each time (i.e., each second) the current value of the count-down timer changes, the value displayed in the field 1604 is updated to reflect the change in the current value of the count-down timer.

The process of FIG. 15 includes a loop of decision blocks 1508, 1510, 1512.

Figure 16:
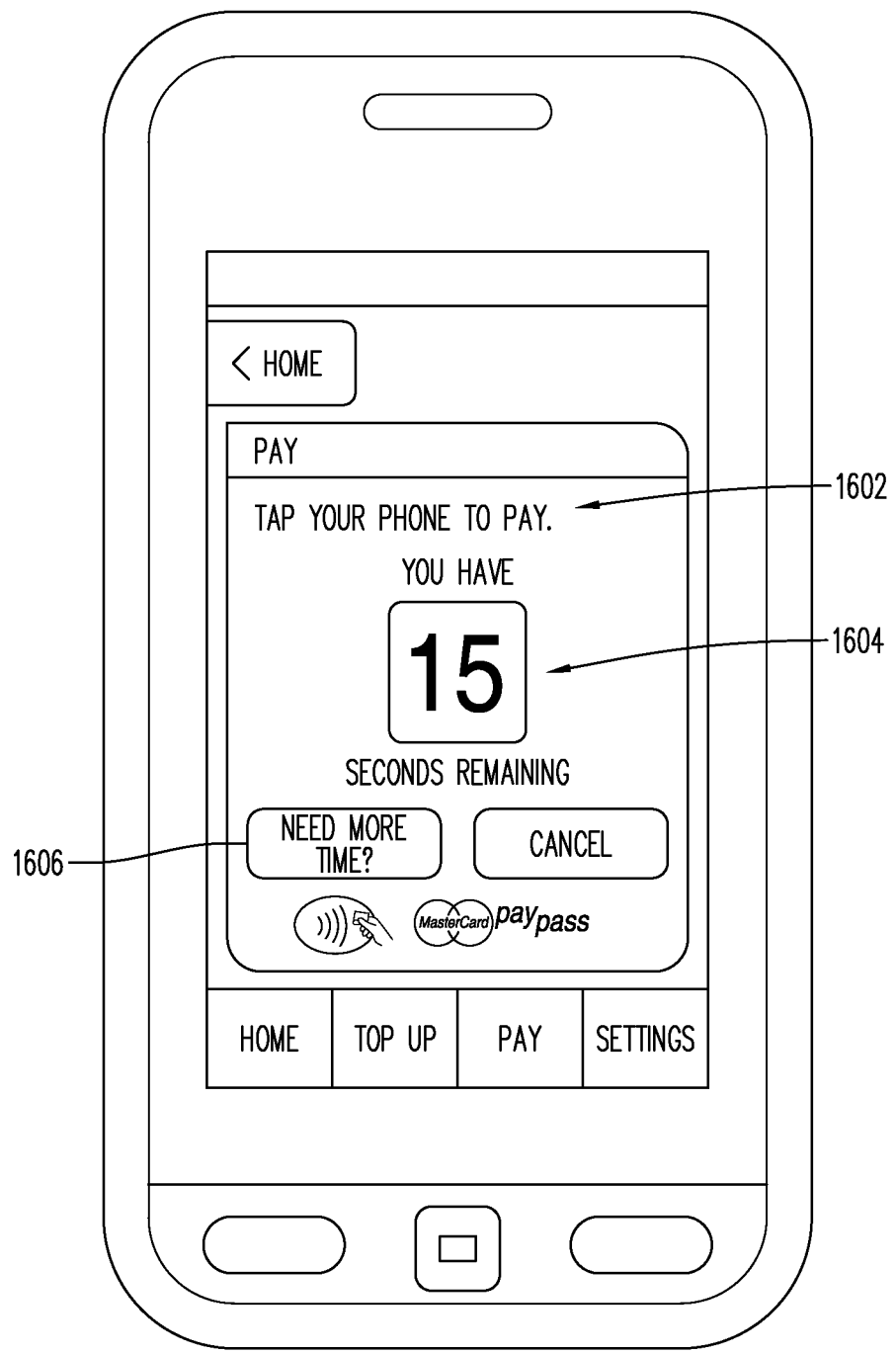
FIGS. 16 and 17 are example screen displays that may be provided by the payment-enabled mobile telephone in connection with transactions performed in accordance with the process of FIG. 15.

If the user actuates a "more time" button 1606 shown in FIG. 16, then the process of FIG. 15 branches out of the loop from decision block 1508 to block 1514. At block 1514, the payment-enabled mobile telephone 102 re-starts the count-down timer function. This may include increasing the current value of the timer function to its original value, or simply adding some time to the current value. The process of FIG. 15 then loops back to block 1506 from block 1514.

If the user taps the payment-enabled mobile telephone 102 on the proximity reader component, then the process of FIG. 15 branches out of the loop from decision block 1510 to block 1516, at which the transaction is processed.

Figure 17:
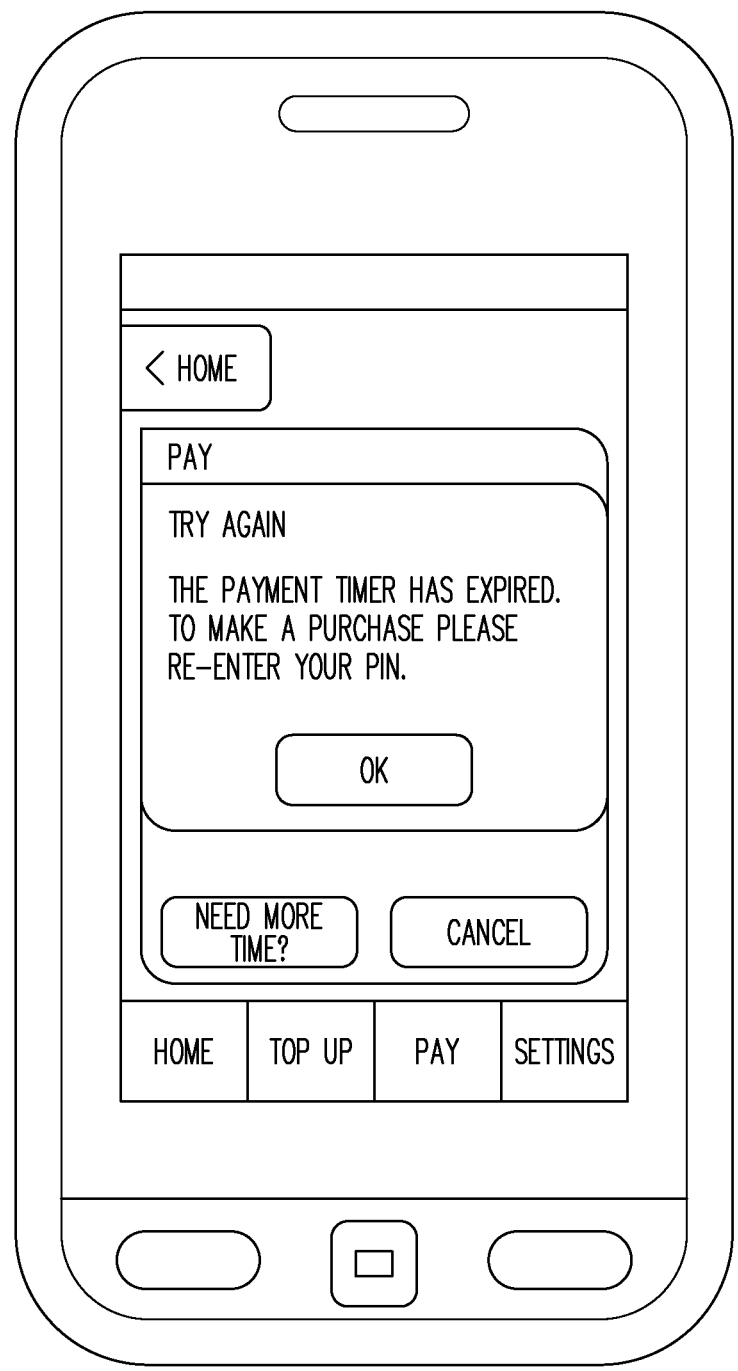

If the timer function reaches zero before the user requests more time or taps the phone on the proximity reader component, then the process branches out of the loop from decision block 1512 to block 1518. At block 1518, the payment application program clears the PIN verification status flag. In addition, the payment-enabled mobile telephone 102 may present a screen display like FIG. 17 to the user. In this screen display, the user is informed that the timer has expired and that he/she needs to re-enter his/her PIN.

A process like FIG. 15, with accompanying count-down function, may also be triggered by the user's entry or pre-entry of an 'ACK' signal.

Figure 18:
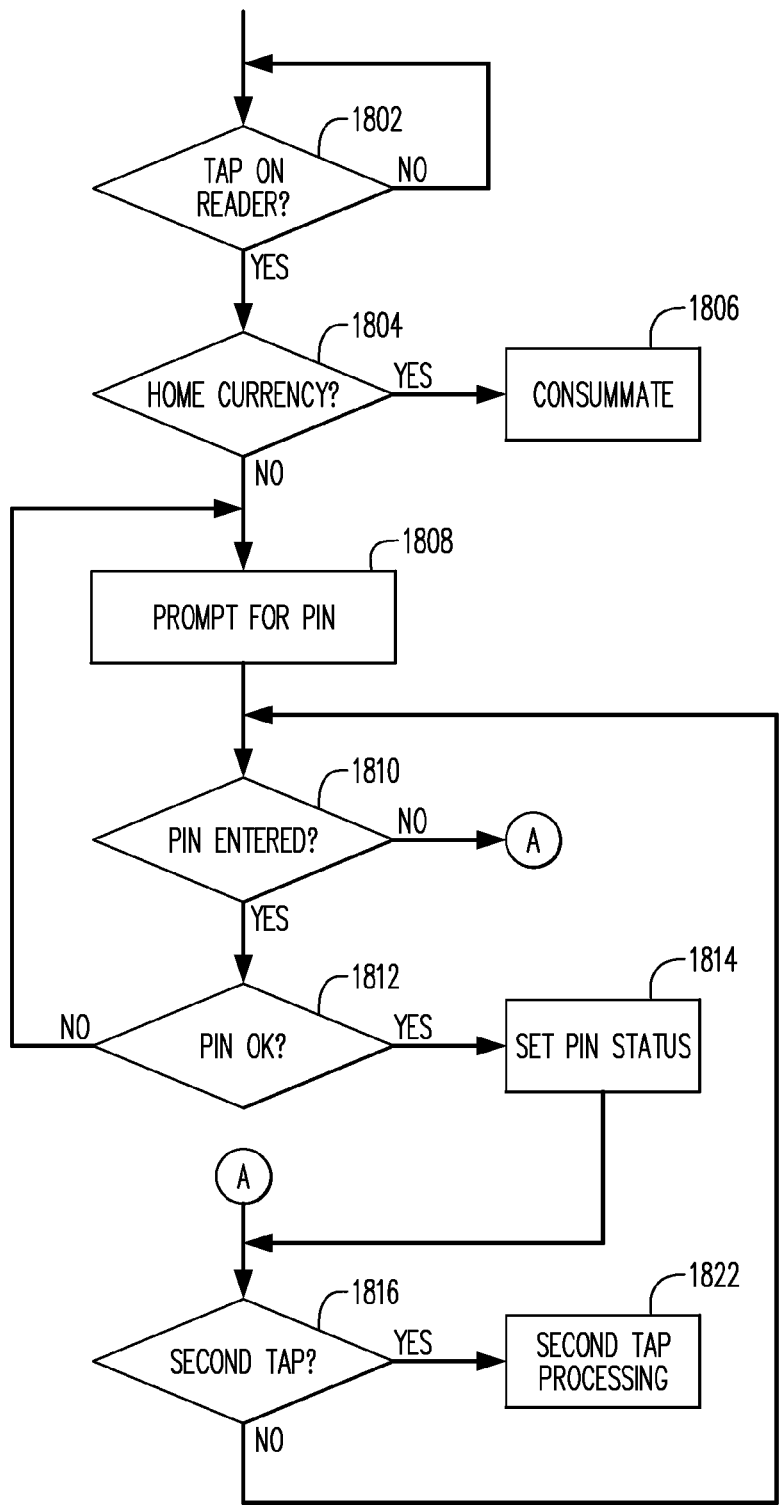
FIGS. 18 and 19 are additional flow charts that illustrate processes that may be performed in the system of FIG. 1 according to aspects of the present invention.

FIG. 18 is a flow chart that illustrates still another process that may be implemented for risk management purposes in the payment application program according to aspects of the present invention. In this process, cardholder verification may be required for transactions conducted in a currency other than the user's home currency, but may not be required when the transaction is in the user's home currency.

At decision block 1802 in FIG. 18, the process idles until the payment-enabled mobile telephone 102 is tapped on a proximity reader component. Once this occurs, the process advances from decision block 1802 to decision block 1804. At decision block 1804, the payment application program determines whether a currency identifier included in the transaction information (from the POS terminal 106, in the exchange of communications during the "tap") indicates that the current transaction is in the user's home currency (i.e., in the currency in which the user's payment card account is denominated). If so, block 1806 follows decision block 1804. At block 1806, the payment-enabled mobile telephone 102 consummates the transaction as part of the communications with the POS terminal 106 during the tap detected at 1802, and without requiring cardholder verification.

However, if at decision block 1804 the payment application program determines that the currency for the current transaction is not the user's home currency, then cardholder verification ensues. That is, block 1808 follows decision block 1806. At block 1808 the user is prompted to enter his/her PIN. For example, a screen display similar to FIG. 11 may be used, except that the screen display may include a specific notification to the user as to the currency being used for the transaction (e.g., "This transaction is in British pounds.").

Decision block 1810 follows block 1808. At decision block 1810, it is determined whether the PIN has been entered. If so, decision block 1812 follows decision block 1810. At decision block 1812, the payment application program determines whether the PIN, as entered by the user, is valid. This may occur, for example, as described in connection with block 938 in FIG. 9B.

If at decision block 1812 the payment application program determines that the PIN is valid, then block 1814 follows decision block 1812. At block 1814, the payment application program sets the PIN verification status flag. Next, at decision block 1816, the process awaits the "second tap" of the payment-enabled mobile telephone 102 on the proximity reader. Upon the second tap taking place, the transaction is successfully processed (block 1822), assuming that the PIN verification status flag has been set. It will be noted that according to other paths in the flow chart of FIG. 18, block 1814 may be by-passed because the PIN is not entered or is found to be invalid. In these cases, the PIN verification status is not set and the subsequent processing at the second tap results in the transaction being declined.

In some embodiments, the process of FIG. 18 may be modified such that, instead of requiring PIN entry and verification for non-home-currency transactions, the process requires an ACK from the user before consummating the transaction at the second tap.

Typically, the currency for the transaction is indicated by a currency code, and the decision at block 1804 may be based on whether the currency code received from the POS terminal matches the currency code for the user's home currency. In some transactions (e.g., for transit access) the currency code indicator may be a null indicator. In some embodiments, the null indicator may result in PIN verification or ACK being required; in other embodiments, the null indicator will not cause such requirements.

Figure 19:
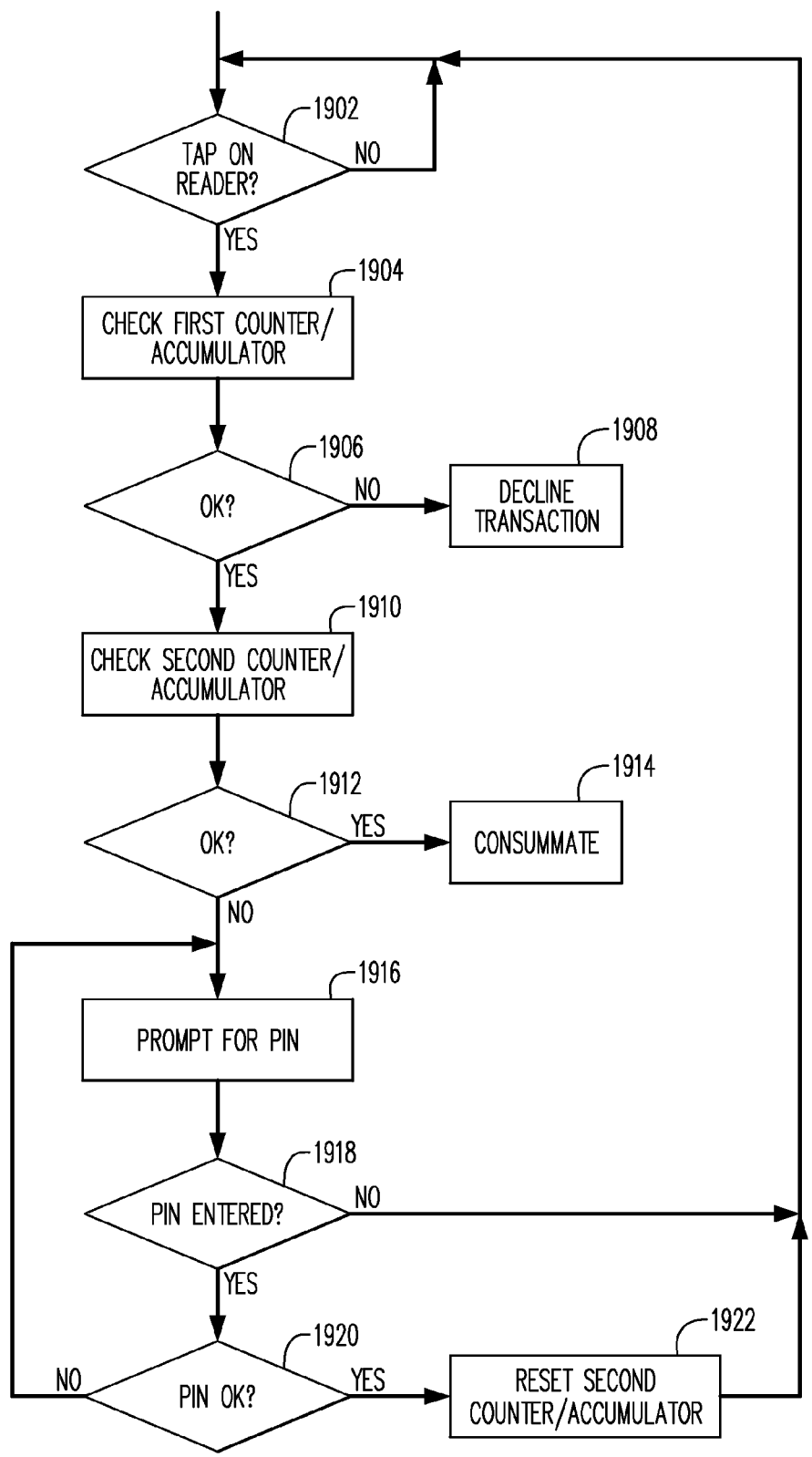

FIG. 19 is another flow chart that illustrates a process that may be performed in the payment-enabled mobile telephone 102 in accordance with aspects of the present invention. As some background to FIG. 19, in some embodiments of the payment-enabled mobile telephone 102, the payment-enabled mobile telephone 102 may store two counters and two accumulators. For example, the counters and accumulators may be implemented in the NVM 428 shown in FIG. 4. Each counter may count the number of transactions for which the payment-enabled mobile telephone 102 has been used since the respective counter was reset. Each accumulator may store the cumulative value of all transactions for which the payment-enabled mobile telephone 102 was used since the respective accumulator was reset. One of the counters may be associated with one of the accumulators and both may be reset at the same time. The other counter may be associated with the other accumulator and again the other counter and accumulator may both be reset at the same time, although not necessarily at the same time as the first counter and accumulator.

The first counter/accumulator combination may be used for one purpose and the second counter/accumulator combination may be used for a different purpose. For example, the first counter/accumulator combination may be used for financial risk management purposes prescribed by the issuer—e.g., to track the usage of the payment aspects of the payment-enabled mobile telephone 102 relative to prepaid funds stored in the payment-enabled mobile telephone 102, and to enforce a top-up requirement when the prepaid funds are exhausted. The second counter/accumulator combination may be used for risk management relative to the possibility that the payment-enabled mobile telephone 102 may be lost or stolen. In this respect (and as will be seen from the following discussion of FIG. 19), the second counter/accumulator combination may be used to enforce a cardholder verification requirement after a certain number of, and/or a certain cumulative value of, transactions since the last time the second counter/accumulator combination was reset.

Turning now to FIG. 19, at decision block 1902 the process idles until the payment-enabled mobile telephone 102 is tapped on the proximity reader component. Once this occurs, block 1904 follows decision block 1902. At block 1904, the payment application program checks the current value of either or both of the first counter and the first accumulator to determine whether the current value is in excess of a limit prescribed for financial risk management purposes by the issuer of the user's payment card account. (Alternatively, the checking of the first counter/accumulator value may be for some other purpose.)

Following block 1904 is decision block 1906, at which the payment application program determines whether the current value of the first counter and/or first accumulator is acceptable for continuing with the transaction. If not, the payment-enabled mobile telephone 102 declines the transaction, as indicated at 1908. (As part of 1908, the payment-enabled mobile telephone 102 may display to the user a suitable error message and/or prompt, such as "Please top-up your pre-paid account before this transaction".)

If at decision block 1906 the first counter and/or first accumulator value is not found to be problematic, then the process of FIG. 19 advances to block 1910. At block 1910, the payment application program checks the current value of either or both of the second counter and the second accumulator to determine whether either or both have exceeded a "lost or stolen" (L&S) limit. (Alternatively, the second counter/accumulator combination may be used for another purpose besides L&S risk management.)

At decision block 1912, the payment application program determines whether either or both of the L&S counter/accumulator current value is acceptable. If so, block 1914 follows. At block 1914, the payment-enabled mobile telephone 102 consummates the current transaction, which may take place during the same exchange of communications that was initiated by the "tap" detected at 1902.

However, if the payment application program determines at decision block 1912 that the L&S counter and/or accumulator has exceeded the L&S risk management limit, then the process advances from decision block 1912 to block 1916. At block 1916, the payment-enabled mobile telephone 102 prompts the user to enter his/her PIN. For example, the payment-enabled mobile telephone 102 may present a screen display like that shown in FIG. 11.

Decision block 1918 follows block 1916. At decision block 1918, the payment application program determines whether the PIN has been entered. If so, the process of FIG. 19 advances from decision block 1918 to decision block 1920. At decision block 1920, the payment application program determines whether the PIN, as entered by the user, is valid. This may be done, for example, in the manner described above in connection with block 938 in FIG. 9B.

If the payment application program determines that the PIN as entered is valid, then block 1922 follows decision block 1920. At block 1922, the payment application program resets the L&S counter and accumulator. The process of FIG.

19 may then loop back to decision block 1902, such that the user may "second tap" the payment-enabled mobile telephone 102 on the proximity reader component. The second tap will result in the process following the path through blocks 1904, 1906, 1910 and 1912; arriving at consummation of the transaction (block 1914).

Otherwise, if the PIN is not entered, or is not entered correctly, the process of FIG. 19 may branch or loop back so as to by-pass block 1922. A suitable time-out function and/or PIN retry limit may be present to prevent indefinite looping of the process of FIG. 19.

In some embodiments, the L&S counter/accumulator may be reset each time the user enters a valid PIN, whether the user was prompted to do so for purposes of L&S risk management or for another reason (e.g. for a high value transaction).

Figure 20A:
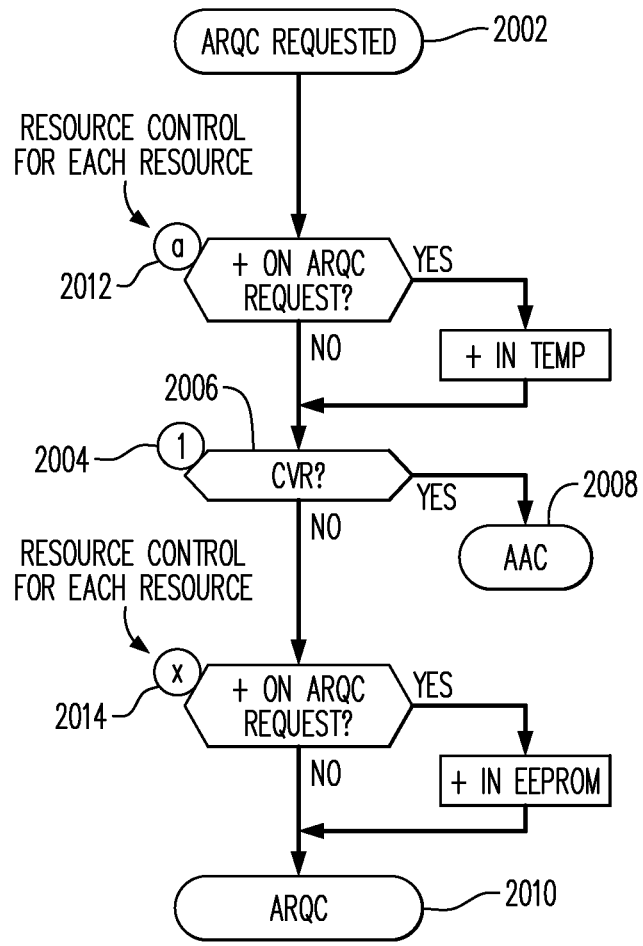
FIGS. 20A and 20B are flow charts that illustrate aspects of the invention relating to possible configurations of a payment application program in a payment-enabled mobile telephone.
Figure 20B:
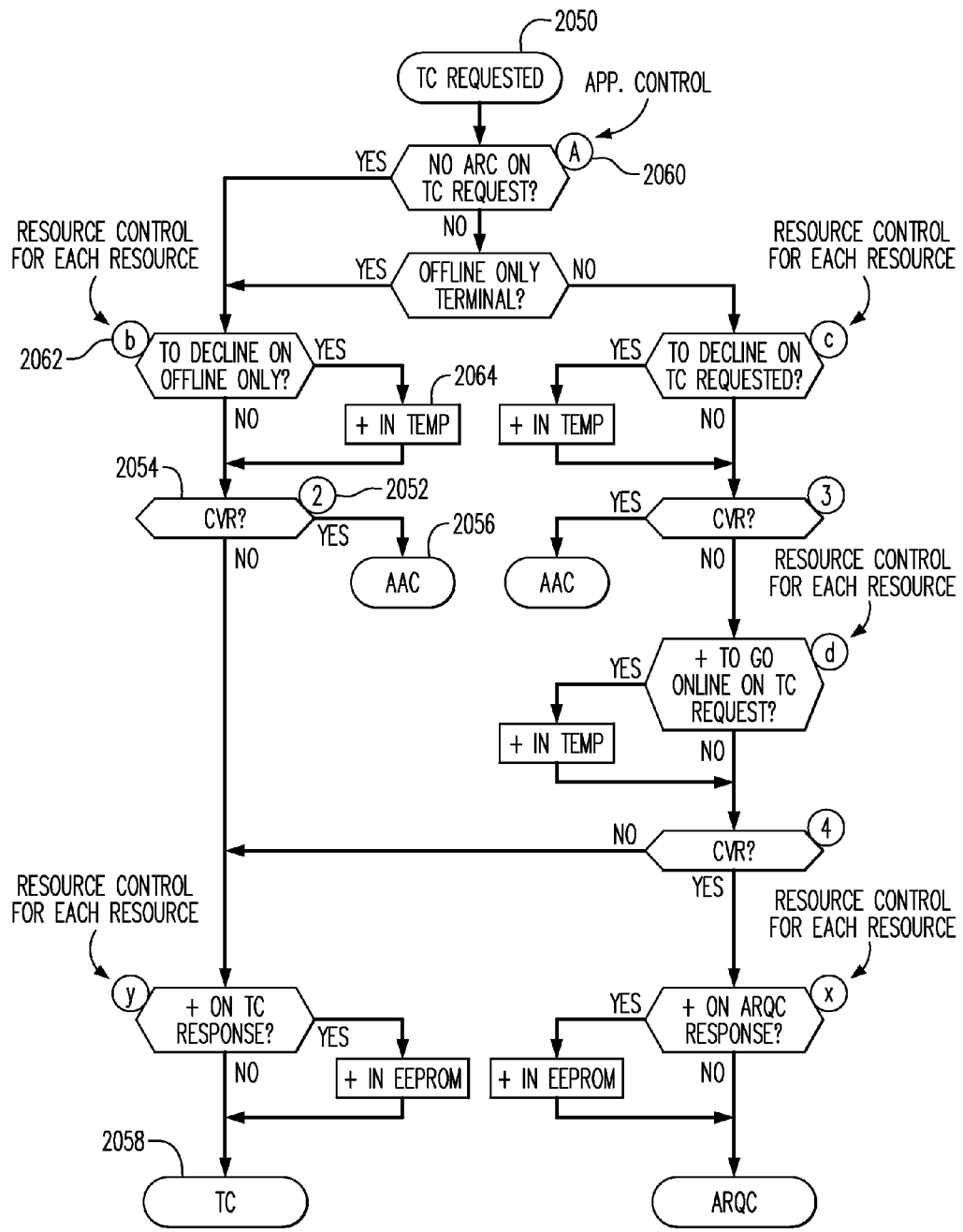

The following discussion will provide background to FIGS. 20A, 20B and 20C and, among other subjects, is concerned with issuer and/or user configuration of the payment application program, and temporary versus permanent updating of counters and/or accumulators associated with the payment application program.

When a card (or other payment device such as a payment-enabled mobile telephone) is presented to a terminal (e.g., in accordance with the EMV or PayPass processes), the terminal first performs some checks and then will ask the card to provide a cryptogram. There are three types of cryptograms (and so three types of requests from the terminal): (1) AAC ("application authentication cryptogram")—for a declined transaction; (2) ARQC ("authorization request cryptogram")—for an online transaction (This cryptogram is sent online to the issuer for authorization. The issuer will then decide to approve or decline the transaction and inform the terminal in the authorization response about that decision.); and (3) TC ("transaction certificate")—for an approval from the card or device. If a TC is requested by the terminal at the beginning of the transaction, before going online to the issuer, then the intention of the terminal is to have the transaction offline approved, i.e. approved without going online to the issuer.

The possibilities for the card are consequently as follows: (1) The terminal asks for an AAC (In this case, the card can only decline, i.e. provide the AAC.); (2) the terminal asks for an ARQC (The card can then provide the ARQC for online authorization, or the card can decline the transaction and provide an AAC); or (3) the terminal asks for a TC (The card can then provide the TC—the transaction is then offline approved or the card can then provide an ARQC for online authorization or the card can decline the transaction and provide an AAC).

In these situations, the card/payment device makes an analysis to decide about how the transaction will be performed. This analysis may be based on a number of different factors, but for present purposes only the analysis as it relates to the state of counters and accumulators of transactions will be considered.

Consider the following examples:

An "offline-only" card never goes online. When the terminal is asking for an ARQC from such a card, it will always receive an AAC.

An offline/online card may decide, when the terminal asks for a TC, to give the TC (so offline approve) if an accumulator is below a certain limit or return an ARQC if the accumulator is above the limit. Typically, this accumulator could cumulate all successive offline transactions; and the issuer may allow transactions to be offline until a threshold (limit) is reached. When the limit is reached, the issuer wants to see the card (i.e., an online transaction is required; this protects against over spending).

At personalization, the issuer may configure the card/payment device (i.e., may configure the payment application program in the payment device) so that the device will take one decision or another depending on the circumstances. This may work as follows:

For each accumulator and counter, two limits may be assigned at personalization: the lower limit and the upper limit.

For the analysis in response to the interaction with the terminal, the card/payment device compares the accumulators and counters to their respective limits. The payment application program sets a bit in internal data (the CVR—item 526, FIG. 5A) when a limit is reached. For instance, if there is only one counter and one accumulator in the card: there would be four relevant bits in the CVR: (1) Counter lower limit exceeded, (2) counter upper limit exceeded, (3) accumulator lower limit exceeded, and (4) accumulator upper limit exceeded. In a case where the counter has reached the counter lower limit and the accumulator has reached the accumulator upper limit, the card would set the two bits "Counter lower limit exceeded" and "Accumulator upper limit exceeded" in the CVR 526.

Now the issuer may configure the payment application program to determine which action is to be taken in various circumstances by personalizing other data called CIACs or CIAC bits ("card issuer action code"—also referred to as the control mask 530 in FIG. 5A). The CIAC bits would also be four bits in the example, defining the action to take whenever a corresponding bit in the CVR is set. The card risk management portion of the payment application program makes use of 4 different CIAC bits (numerals 1, 2, 3, 4 located in circles associated with decision blocks in FIGS. 20A and 20B) with each CIAC having four bits corresponding to the four bits in the CVR, i.e. there are four different comparisons between a CIAC and the CVR. For each of these comparisons, the corresponding CIAC defines the decision based on the state of the counter or accumulator.

Referring now to FIG. 20A, it is assumed that the terminal is requesting an ARQC (block 2002), the card will use CIAC 1 (circle 2004/decision block 2006) and the decision will be either to decline (AAC—block 2008) or to go online (ARQC—block 2010). If for example the CVR bit "Counter lower limit exceeded" is set and the corresponding bit in the CIAC1 is set, the card would decline.

If the terminal is requesting a TC (FIG. 20B, block 2050) and the terminal is offline only, the card will use CIAC 2 (circle 2052/decision block 2054 and the decision will be either to decline (AAC—block 2056) or to approve offline (TC—block 2058). If for example the CVR bit "Counter upper limit exceeded" is set and the corresponding bit in the CIAC 2 is set, the card would decline.

There are also other settings, personalized in the card/payment device/payment application program, used to determine what decisions the device will make.

There may be a setting at application level for the payment application program to indicate whether the card/payment device is or is not offline only. This is represented by a capital "A" in the drawings (e.g., circle 2060, FIG. 20B) in the ensuing discussion.

There may be settings at the resource level (so settings can be personalized differently for each accumulator and counter). These are represented by lower case letters a, b, c, d, x, y (in circles associated with decision blocks) in the drawings.

The lower case letters a, b, c, d define, for each accumulator and counter, if the application should count/accumulate the current transaction temporarily before checking the following CIAC. For example, setting "b" (circle 2062, FIG. 20B) is used to define if, when setting the CVR bits before the comparison with CIAC2, the current transaction should be counted or accumulated. Further, setting "a" (circle 2012, FIG. 20A) is used to define if, when setting the CVR bits before the comparison with CIAC1, the current transaction should be counted or accumulated. This inclusion of the current transaction or not is done temporarily, i.e. only for the comparison with the following CIAC.

Settings "x" and "y", in turn, define, for each accumulator or counter independently and when the decision is already taken, if the current transaction should be counted or accumulated permanently. Setting "x" (circle 2014, FIG. 20A) is for counting/accumulating when an ARQC is returned and setting "y" (circle 2062, FIG. 20B) is for counting/accumulating when a TC is returned.

To give an example of the temporary versus permanent updating of a counter or accumulator, suppose the card/device is offline only and allowed to spend up to a $20 limit (the upper limit). Assume further that $15 has already been spent, and the current transaction is for $6. If "b" is set, the comparison "2" (decision block 2054, FIG. 20B) would give a decline because the current transaction is counted/accumulated (block 2064) before comparing with the limit (15+6>20), setting the bit in the CVR and comparing with the CIAC 2. So with these settings the user would never spend more than the limit ($20). Now say "b" isn't set but "y" is set. Then the comparison "2" would give a TC because the current transaction isn't counted before comparing with the limit (15<20), setting the bit in the CVR and comparing with the CIAC 2. But when the transaction is consummated, a permanent count/accumulation occurs and the accumulator value is now 21. So the next time, the transaction will be declined (it will be necessary to reset the counter to allow more transactions). With these settings the user can spend more than the $20 limit, but just once. Once the user has spent more, the user needs to load more money in the payment device.

One feature of the invention allows the issuer to configure the payment application program, for each counter or accumulator, on an individual basis, whether to temporarily update the counter/accumulator before checking any CIAC bit.

According to another feature, the issuer is able to configure the payment application program, for each counter or accumulator, whether or not to update the counter/accumulator permanently for TCs or ARQCs.

The logic in the application, with the 4 CIACs and the options described, give the issuer a lot of possibilities as to the card risk management that will be done. By just personalizing the application differently, issuers would have cards behaving differently. An advantage of the solution is that it covers a lot of different behaviors.

In the table shown in FIG. 20C each row of the table shows a different example (Examples 1, 2, 3, 4) of definitions of behavior for the payment application program that are possible in accordance with various embodiments of the invention. The column headings in the table correspond to the setting/configuration bits that were discussed above. Example 2 may be suitable for an "offline only" configuration of the payment application program. Example 3 may be suitable for a "predominantly offline" configuration of the payment application program.

Example 1 may be suitable for a card risk management implementation in which transactions can be performed offline until a certain limit is reached. Beyond this limit (lower limit), the payment application will attempt to go online to the issuer. If the terminal is offline only, transactions can still be performed offline until a second limit (upper limit) is reached. Beyond this second limit, transactions have to be approved online.

Example 4 may be suitable for an online only product in which all the transactions have to be approved online by the issuer. In this situation, an accumulator is used to cumulate transactions and when the accumulated amount exceeds a certain limit (upper limit), transactions are declined (so the last approved transactions may go beyond the limit, but once the limit is exceeded, transactions are declined). The accumulator then has to be reset to zero, for instance by the issuer with an over-the-air communication or by the user entering the PIN (the accumulator is then cumulating consecutive transactions done without PIN entry—hence the "no CVM" notation in the table of FIG. 20C; this is a protection against use of a stolen payment device—e.g., if more than say $25 is spent, the PIN has to be entered).

There are many other possible configurations besides those reflected in the table of FIG. 20C.

Figure 21:
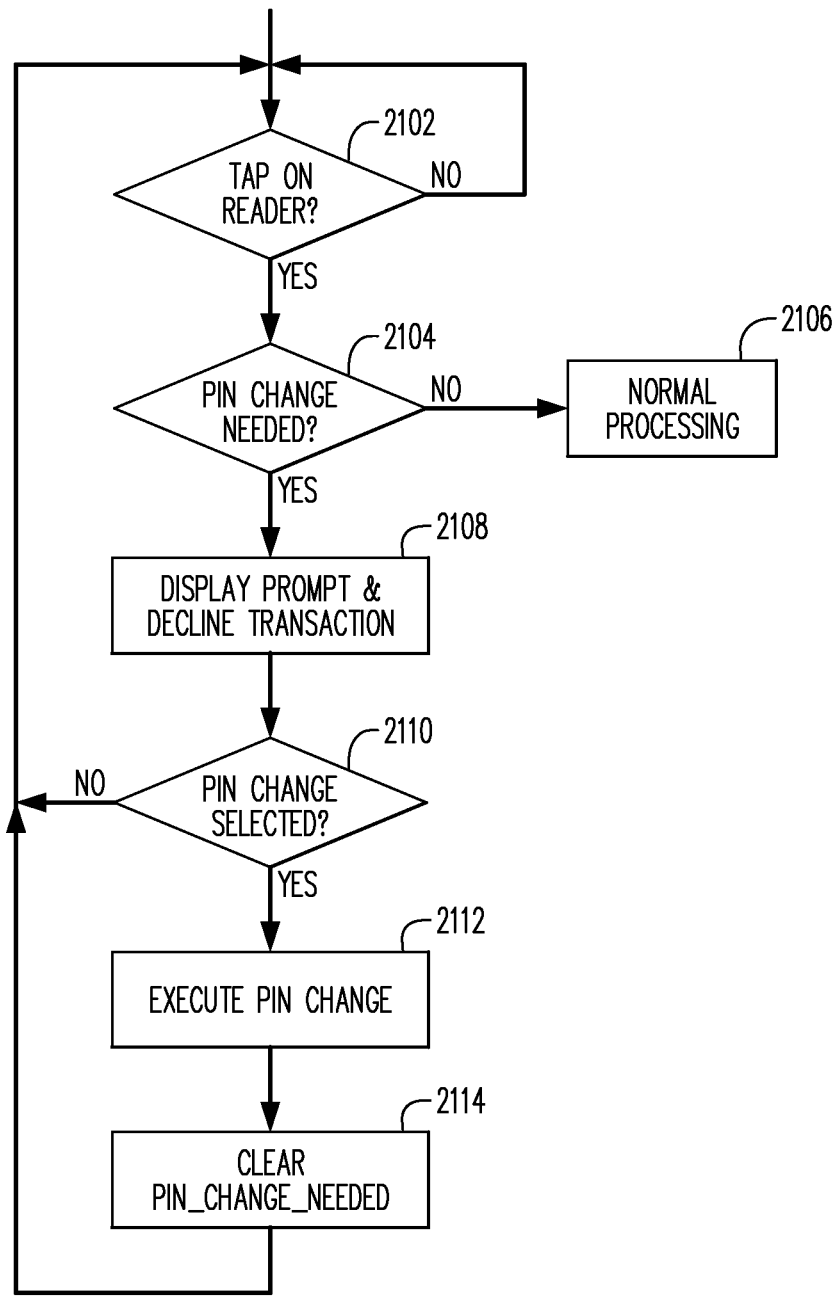
FIGS. 21-23 are further flow charts that illustrate processes that may be performed in the system of FIG. 1 according to aspects of the present invention.

FIG. 21 is a flow chart that illustrates yet another process that may be implemented in the payment-enabled mobile telephone 102 according to aspects of the present invention. The process of FIG. 21 may provide the advantage of allowing payment card account issuers to enforce a requirement that the user change his/her PIN before first use of the payment-enabled mobile telephone 102 for a payment or purchase transaction.

The process of FIG. 21 may idle at decision block 2102 until the payment-enabled mobile telephone 102 detects that the user has tapped the payment-enabled mobile telephone 102 on the proximity reader component. Once this occurs, the process may advance from decision block 2102 to decision block 2104. At decision block 2104, the payment application program may read a relevant status flag, or may otherwise determine whether the status of the payment application program is such that the user is required to change his/her PIN. If such is not the case, then the process may advance from decision block 2104 to block 2106. At block 2106, the transaction may be handled in a normal manner, as for example described above in connection with one or more of the previous flow chart drawings.

However, if at decision block 2104 the payment application program determines that the user is required to change his/her PIN, then block 2108 follows decision block 2104. At block 2108, the payment-enabled mobile telephone 102 may display a prompt to the user to change his/her PIN; the same prompt may indicate that the transaction is being declined.

Decision block 2110 follows block 2108. At decision block 2110, the payment-enabled mobile telephone 102 determines whether the user has selected a function on the payment-enabled mobile telephone 102 by which the user is able to change his/her PIN. If so, the process advances from decision block 2110 to block 2112. At block 2112 the user operates the payment-enabled mobile telephone 102 so as to execute the PIN-change function. This function itself may be provided according to known techniques.

Following block 2112 is block 2114. At block 2114 the payment application program may clear the flag that requires the user to change his/her PIN. The payment-enabled mobile telephone 102 is now usable for a payment/purchase transaction. Accordingly the process of FIG. 21, if undertaken again, will advance through decision blocks 2102 and 2104 to normal transaction handling at block 2106. This will not be the case if the user does not select the PIN-change function at decision block 2110.

Figure 22:
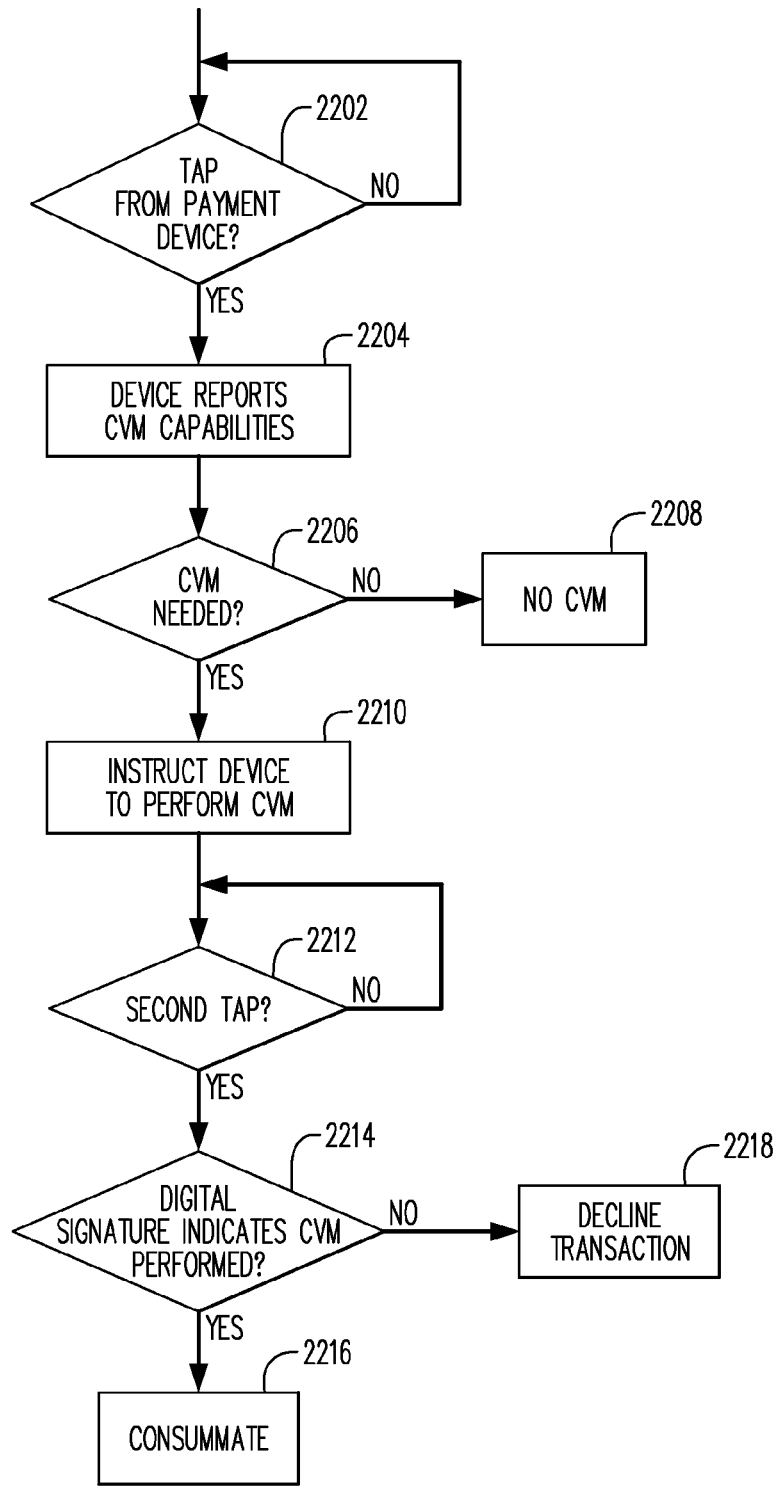

FIG. 22 is a flow chart that illustrates a process that may be performed in the POS terminal 106/proximity reader component 104 in accordance with aspects of the present invention. FIGS. 23A and 23B are companions to FIG. 22 in that FIGS. 23A and 23B show a process that may be performed in accordance with aspects of the present invention in the payment-enabled mobile telephone 102 in conjunction with the POS terminal process of FIG. 22.

Figure 23:
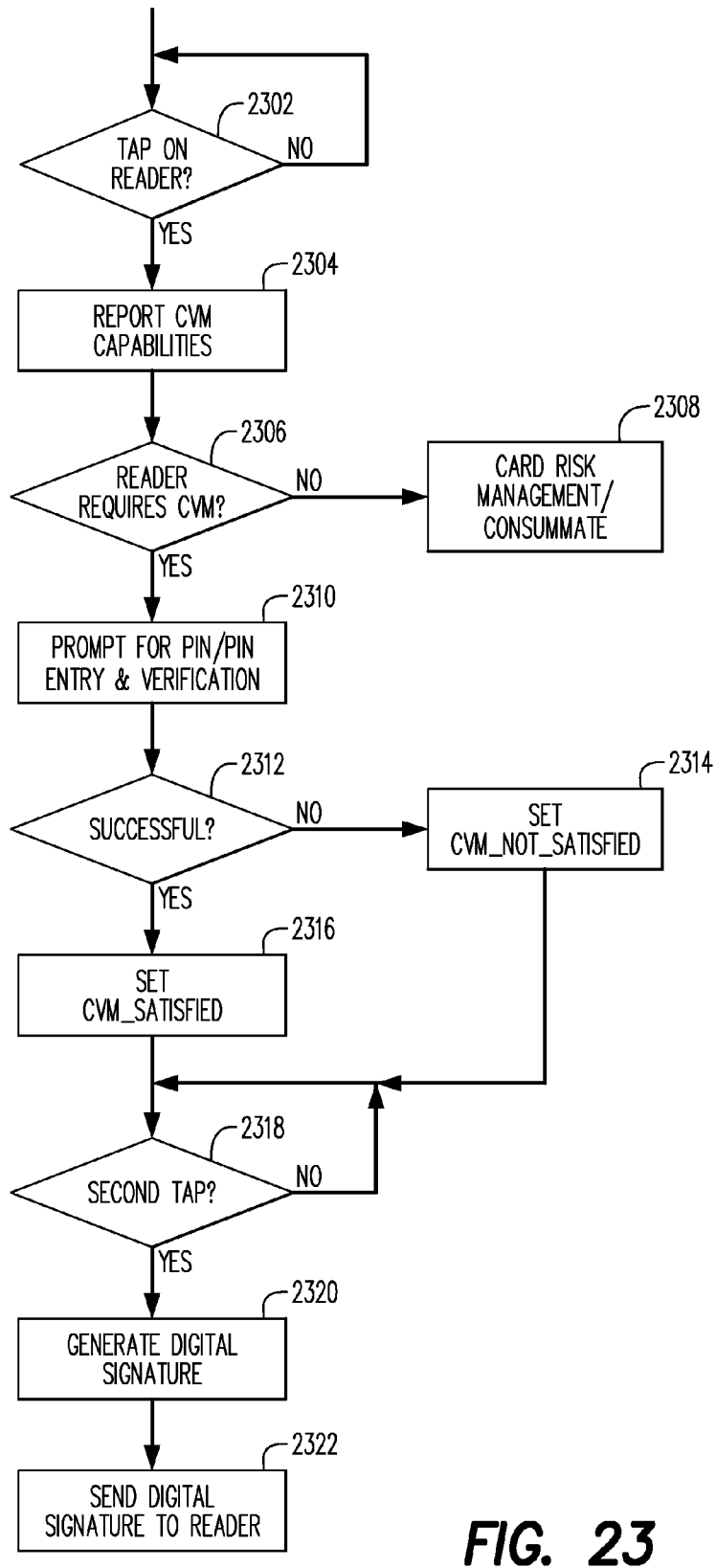

FIGS. 22 and 23 relate to a joint process whereby the POS terminal determines that a CVM process should be performed by the payment-enabled mobile telephone 102. This may occur for example in connection with risk management rules embodied in the POS terminal (and established by the retailer's acquiring FI) relating to high value transactions.

At decision block 2202 in FIG. 22, the POS terminal 106/proximity reader component 104 determines whether a contactless payment device (possibly a payment-enabled mobile device) has been tapped on the proximity reader component 104. If so, the process of FIG. 22 advances from decision block 2202 to block 2204. At block 2204, and from the exchange of communications resulting from the "tap", the POS terminal 106/proximity reader component 104 receives a report from the payment device concerning what capabilities for cardholder verification the payment device has. If the payment device is a conventional contactless payment card, it may report that it has no cardholder verification capabilities. However, if the payment device is the payment-enabled mobile telephone 102, it may report that it stores a PIN and includes a numeric keypad or the equivalent and thus is capable of performing a PIN entry and verification for purposes of cardholder verification.

At decision block 2206, the POS terminal 106/proximity reader component 104 may determine whether cardholder verification is required for the current transaction. For example, the POS terminal 106/proximity reader component 104 may determine whether the transaction is considered a high value transaction requiring cardholder verification. If not, the process advances from decision block 2206 to block 2208. At block 2208, the transaction proceeds without cardholder verification, or at least without any cardholder verification being required by the POS terminal. In this case, for example, the transaction may be consummated via the exchange of communications arising in the "tap" detected at decision block 2202.

Considering again decision block 2206, if the POS terminal is requiring cardholder verification, then the process of FIG. 22 advances from decision block 2206 to block 2210. At block 2210, the POS terminal 106/proximity reader component 104 instructs the payment-enabled mobile telephone 102 to perform CVM. (This depiction of the process assumes that the payment device has indicated that it has cardholder verification capabilities.)

Following block 2210, the process of FIG. 22 idles at decision block 2212 until the payment device is tapped once more on the proximity reader component 104. Once this occurs, the process advances from decision block 2212 to decision block 2214. At decision block 2214, the POS terminal 106/proximity reader component 104 determines whether a digital signature received from the payment-enabled mobile telephone 102 during the "second tap" exchange of communications indicates that the payment-enabled mobile telephone 102 has successfully performed the required cardholder verification process. If so, then the POS terminal 106/proximity reader component 104 completes consummation of the transactions, as indicated at block 2216. However, if the digital signature from the payment-enabled mobile telephone 102 does not indicate that the payment-enabled mobile telephone 102 has successfully performed the cardholder verification process, then the POS terminal declines the transaction, as indicated at block 2218.

Referring now to FIG. 23, the process of FIG. 23 idles at decision block 2302 until the payment-enabled mobile telephone 102 detects that it has been tapped on the proximity reader component 104. Once this occurs, the process advances from decision block 2302 to block 2304. At block 2304, the payment-enabled mobile telephone 102 reports its cardholder verification capabilities to the proximity reader component 104 as described above in connection with block 2204 in FIG. 22.

Continuing to refer to FIG. 23, decision block 2306 follows block 2304. At decision block 2306, the payment application program in the payment-enabled mobile telephone 102 determines whether the POS terminal is requiring cardholder verification. If not, then the process advances to block 2308. At block 2308, the payment-enabled mobile telephone 102 proceeds with any risk management process required by the payment application program in the payment-enabled mobile telephone 102 and/or proceeds to consummate the transaction (e.g., as part of the communication exchange at the "tap" detected at decision block 2302).

Referring again to decision block 2306, if at this point the payment application program determines that the POS terminal 106/proximity reader component 104 has required the payment-enabled mobile telephone 102 to perform cardholder verification, then the process advances to block 2310. At 2310, the payment-enabled mobile telephone 102 prompts the user to enter his/her PIN and then verifies the PIN as entered. PIN entry and verification may occur as described hereinabove in connection with several of the previous flow chart drawings. Next, at decision block 2312, the payment application program determines whether the PIN entry and verification have been performed successfully. If not, the payment application may set a flag (block 2314) to indicate failure of cardholder verification. However, if the PIN entry and verification were successful, then the payment application program may set a flag accordingly (block 2316).

Following block 2314 or 2316, as the case may be, the process advances to decision block 2318, at which the process awaits a second tap of the payment-enabled mobile telephone 102 on the proximity reader component 104. Once this takes place, the process advances to block 2320 from decision block 2318. At block 2320 the payment application program builds a digital signature for the transaction based in part on the flag as set in block 2314 or 2316, as the case may be. At 2322, the payment-enabled mobile telephone 102 forwards the resulting digital signature to the POS terminal 106/proximity reader component 104, for consideration by the POS terminal 106/proximity reader component 104 as described above in connection with decision block 2214 in FIG. 22. The digital signature includes an indication as to whether the payment-enabled mobile telephone 102 successfully completed cardholder verification. (During the same exchange of communications at the second tap, the payment-enabled mobile telephone 102 may provide the user's payment card account number and/or other information to the POS terminal 106/proximity reader component 104.)

In some embodiments, the POS terminal 106/proximity reader component 104 may not have the capability (assumed to be present for FIGS. 22-23), of verifying the digital signature generated by the payment application program in the payment-enabled mobile telephone 102. In such embodiments, the process of FIGS. 22-23 may be modified. According to this modification, the payment application program generates a cryptographically calculated transaction security code (e.g., a CVC3) that indicates whether or not the payment-enabled mobile telephone 102 successfully verified the cardholder. The payment-enabled mobile telephone 102 transmits the security code to the POS terminal 106/proximity reader component 104 as part of the second tap exchange of communications. The POS terminal 106 then passes the security code to the issuer as part of an authorization request and relies on the issuer to determine whether the security code indicates successful cardholder verification.

In some embodiments of the process of FIGS. 22-23, the required cardholder verification may be accomplished by pre-entry of the PIN into the payment-enabled mobile telephone 102 prior to the first tap, in which case the transaction may be consummated and completed via the exchange of communications at the first tap without need for a second tap.

While many of the above-described risk management processes have been described above apart from others, in practice many or all of the processes may be implemented in a single payment application program that integrates the desired processes. In some embodiments the issuer and/or the user may be permitted to configure the payment application program so as to determine that one or more of the risk management processes will be implemented by the payment application program for transaction-related operation of the payment-enabled mobile telephone 102. For example, in some embodiments, the issuer may allow PIN entry or ACK to be omitted with respect to some transactions, but the user may elect—and may provide input accordingly into the payment-enabled mobile telephone 102 to configure the payment application program—that PIN entry or ACK be required for such transactions. In other embodiments, the issuer may leave it up to the user's option as to whether the user may configure the payment application program to permit pre-entry of PIN or ACK with respect to certain classes of transactions. Thus, in general, the user may be permitted in some respects to give up convenience in order to elect for greater risk management security than the issuer requires. It should also be noted with respect to the process of FIGS. 22-23 that the merchant's acquiring bank may define the CVM requirements at the POS terminal, and thus may require risk management procedures beyond what the issuer and/or user require.

In some embodiments, the payment card account number is always transmitted from the payment device to the POS terminal at the first tap, but the transaction may be aborted in some cases if a required second-tap interaction does not occur. In other embodiments, where a second tap is required, the payment card account number is transmitted from the payment device to the POS terminal only on the second tap.

In some embodiments, a counter may be incremented only for transactions that include a transaction amount (e.g., not for transit access transactions).

In some embodiments, risk management procedures may require both PIN and ACK for some or all transactions.

The payment-enabled mobile telephone (payment application program) may be configured such that, when a PIN or ACK signal is entered (or pre-entered), the entry/pre-entry remains valid for additional transactions. This may be for a predetermined number of additional transactions or for additional transactions during a pre-determined period of time (say, the same day). Thus the PIN-verification flag or ACK status flag may remain set to accommodate the continuing validity of the PIN/ACK entry/pre-entry.

Aspects of the invention have been described above with reference to use of a payment-enabled mobile telephone. Alternatively, however, the principles of the invention are also applicable to other types of mobile devices that store and are at times controlled by a payment application program. Any and all such devices, including payment-enabled mobile telephones, should be understood as included in the term "payment-enabled mobile device".

As used herein and in the appended claims, the term "acceptance entity" refers to a retailer or other organization that operates a proximity reader to read information from a payment-enabled mobile device.

As used herein and in the appended claims, a "currency indicator" is a code or data element that indicates what currency, if any, the current transaction is being conducted in. The currency indicator may be a null indicator that does not indicate a specific currency.

The nonvolatile memory (NVM) referred to herein may be composed of one device or of two or more devices.

As used herein and in the appended claims, a program or device is "configurable between" two or more distinct configurations if input may be provided to the program or device to select between or among the configurations.

As used herein and in the appended claims, the term "POS terminal" includes a proximity reader component included in or connected to such a terminal.

As used herein and in the appended claims, "pre-entry" of a PIN or ACK refers to entry of such a signal prior to the first tap for the current transaction of a payment-enabled mobile device on a proximity reader component.

Relative to a payment-enabled mobile device and a proximity reader, the term "tap" refers either to brief physical contact, or relative positioning such that wireless communication occurs.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A payment-enabled mobile device, comprising:
at least one mobile device processor comprising a non-volatile memory storing a first counter and an associated first accumulator used for financial risk management purposes prescribed by an issuer of a payment card account, and storing a second counter and an associated second accumulator used for risk management purposes related to a lost or stolen mobile device prescribed by the issuer, and storing a payment application program;
an antenna; and
a transceiver, coupled to the antenna, for exchanging wireless signals via the antenna with a proximity reader component; the transceiver operating under control by the at least one mobile device processor and the payment application program;
wherein the payment application program includes instructions configured by the issuer of the payment card account assigned to the user of the payment-enabled mobile device that cause the mobile device processor to:
detect when the payment-enabled mobile device is tapped on a reader;
determine that available prepaid funds are adequate for a current transaction based on a current value of at least one of the first accumulator and the first counter;
determine that a current value of the second counter and the second accumulator exceeds a lost and stolen risk management limit;
prompt the user to perform at least one cardholder verification method (CVM);
determine that the at least one CVM performed by the user is valid;
reset the second counter and the second accumulator;
detect that the mobile device has again been tapped on the reader by the user; and
consummate the transaction.

2. A method of operating a payment-enabled mobile device comprising:
detecting, by a mobile device processor of a payment-enabled mobile device, that the payment-enabled mobile device has been tapped on a reader by a user;
determining, by the mobile device processor, that available prepaid funds stored in a memory are adequate for a current transaction based on a current value of at least one of a first accumulator and a first counter;
determining, by the mobile device processor, that a current value of a second counter and a second accumulator stored in the memory exceeds a lost and stolen risk management limit;
prompting, by the mobile device processor, the user to perform at least one cardholder verification method (CVM);
determining, by the mobile device processor, that the at least one CVM performed by the user is valid;
resetting, by the mobile device processor, the second counter and the second accumulator;
detecting, by the mobile device processor, that the mobile device has again been tapped on the reader by the user; and
consummating, by the mobile device processor, the current transaction.

3. The method of claim 2, wherein after detecting that the payment-enabled device has been tapped on a reader, further comprising:
determining, by the mobile device processor, that available prepaid funds stored in a memory are inadequate for a current transaction based on a current value of at least one of a first accumulator and a first counter;
declining, by the mobile device processor, the current transaction; and
prompting, by the mobile device processor, the user to top-up the prepaid funds amount.

4. The method of claim 2, further comprising, after prompting the user to perform the at least one cardholder verification method (CVM), determining, by the mobile device processor, one of that the at least one CVM performed by the user is incorrect or that a predetermined time has elapsed without performance of the at least one CVM by the user;
prompting, by the mobile device processor, the user to perform at least CVM and incrementing a counter;
determining, by the mobile device processor, that the at least one CVM performed by the user is valid;
resetting, by the mobile device processor, the second counter and the second accumulator;
detecting, by the mobile device processor, that the mobile device has again been tapped on the reader by the user; and
consummating, by the mobile device processor, the current transaction.

5. The method of claim 2, further comprising, after prompting the user to perform the at least one cardholder verification method (CVM):
determining, by the mobile device processor, that one of the at least one CVM performed by the user is incorrect or that a predetermined time has elapsed without performance of the at least one CVM by the user;
determining, by the mobile device processor, that the counter has reached a predetermined limit; and
declining, by the mobile device processor, the current transaction.

* * * * *